(12) United States Patent
Izumi

(10) Patent No.: US 9,306,362 B2
(45) Date of Patent: Apr. 5, 2016

(54) OPTICAL BRANCHING DEVICE, OPTICAL AMPLIFICATION APPARATUS, AND OPTICAL AMPLIFICATION METHOD

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/620,362

(22) Filed: Feb. 12, 2015

(65) Prior Publication Data

US 2015/0288130 A1 Oct. 8, 2015

(30) Foreign Application Priority Data

Apr. 7, 2014 (JP) ................................. 2014-078513

(51) Int. Cl.
  *H01S 3/067* (2006.01)
  *G02F 1/01* (2006.01)
  *G02F 1/09* (2006.01)
  *H01S 3/091* (2006.01)

(52) U.S. Cl.
  CPC .......... *H01S 3/06758* (2013.01); *G02F 1/0136* (2013.01); *G02F 1/09* (2013.01); *H01S 3/091* (2013.01)

(58) Field of Classification Search
  CPC ............ H01S 3/06758; H01S 3/06754; G02F 1/0136; G02F 1/092
  See application file for complete search history.

(56) References Cited

U.S. PATENT DOCUMENTS

| | | | | | |
|---|---|---|---|---|---|
| 5,844,710 A | * | 12/1998 | Fukushima | ............. | G02F 1/093 359/251 |
| 6,126,775 A | * | 10/2000 | Cullen | ............... | B29D 11/0073 156/250 |
| 6,252,708 B1 | * | 6/2001 | Cullen | ............... | B29D 11/0073 359/484.04 |
| 2005/0058391 A1 | * | 3/2005 | Ono | ......................... | G02F 1/31 385/16 |
| 2005/0270635 A1 | * | 12/2005 | Shukunami | ........... | G02F 1/0123 359/337 |
| 2012/0269508 A1 | * | 10/2012 | Komiyama | .......... | H04B 10/564 398/38 |

FOREIGN PATENT DOCUMENTS

| | | | |
|---|---|---|---|
| JP | 63267912 A | * | 11/1988 |
| JP | 5-90671 | | 4/1993 |
| JP | 2003-215647 | | 7/2003 |
| JP | 2007-127988 | | 5/2007 |
| JP | 2009-81473 | | 4/2009 |

* cited by examiner

*Primary Examiner* — Eric Bolda
(74) *Attorney, Agent, or Firm* — Staas & Halsey LLP

(57) ABSTRACT

An optical branching device includes: a Faraday rotator capable of controlling polarized wave of input light based on a change of a magnetic flux density depending on a magnetic field to be provided; a magnet configured to provide the Faraday rotator with the magnetic field; a polarization beam splitter configured to branch, by a polarized wave component, the input light which passes through the Faraday rotator; a bimetal configured to deform depending on a temperature; and a controller configured to have a mechanism to use force accompanying with the deformation of the bimetal so as to control a relative positional relationship between the Faraday rotator and the magnet.

11 Claims, 23 Drawing Sheets

OPTICAL BRANCHING DEVICE, OPTICAL AMPLIFICATION APPARATUS, AND OPTICAL AMPLIFICATION METHOD

CROSS-REFERENCE TO RELATED APPLICATION

This application is based upon and claims the benefit of priority of the prior Japanese Patent Application No. 2014-078513, filed on Apr. 7, 2014, the entire contents of which are incorporated herein by reference.

FIELD

The embodiments discussed herein are related to an optical branching device, an optical amplification apparatus, and an optical amplification method.

BACKGROUND

As a conventional technology related to an optical amplifier, technologies described in Japanese Laid-open Patent Publication No. 2009-81473 and Japanese Laid-open Patent Publication No. 05-90671 are known.

In these Patent Documents, output light (excitation light) of one excitation light source is divided by an optical branching device, and the branched excitation light is entered into each of erbium-doped optical fibers (EDF) of a two-stage configuration.

A branching ratio of excitation light by an optical branching device may be variable. For example, Japanese Laid-open Patent Publication No. 2007-127988 describes a branch switching type optical splitter having a variable branching ratio of input light.

In the afore-mentioned technology, actively controlling (or adjusting) a branching ratio of excitation light is under study.

SUMMARY

According to an aspect of the invention, an optical branching device includes: a Faraday rotator capable of controlling polarized wave of input light based on a change of a magnetic flux density depending on a magnetic field to be provided; a magnet configured to provide the Faraday rotator with the magnetic field; a polarization beam splitter configured to branch, by a polarized wave component, the input light which passes through the Faraday rotator; a bimetal configured to deform depending on a temperature; and a controller configured to have a mechanism to use force accompanying with the deformation of the bimetal so as to control a relative positional relationship between the Faraday rotator and the magnet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
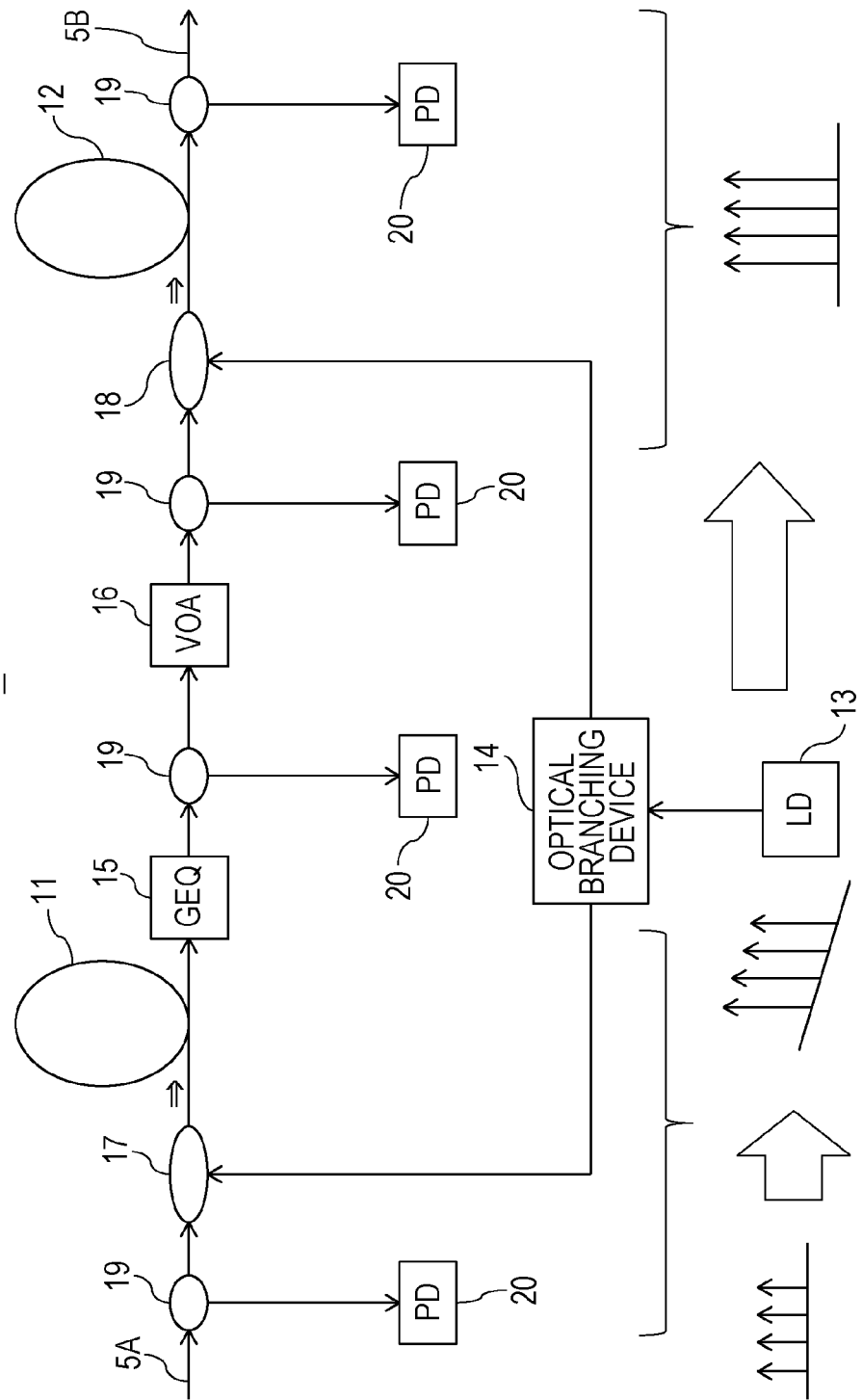
FIG. 1 is a block diagram illustrating a configuration example of an optical amplification apparatus according to an embodiment.

In the following, embodiments of the present disclosure which allows a light branching ratio to be changed without using active control are described with reference to the drawings. However, the embodiments to be described hereinafter are simply exemplary, and not intended to preclude application of different variations or technologies which are not demonstrated hereinafter. Note that in the drawings using the following embodiments, a part to which a same reference numeral is assigned represents a same or similar part, unless otherwise stated.

FIG. 1 is a block diagram illustrating a configuration example of an optical amplification apparatus according to an embodiment. The optical amplification apparatus 1 illustrated in FIG. 1 exemplarily includes a first optical amplification medium 11, a second optical amplification medium 12, an excitation light source 13, and an optical branching device 14.

Signal light inputted to the optical amplification apparatus 1 through an optical transmission line 5A on the input side is amplified at the first optical amplification medium 11, is amplified at the second optical amplification medium 12, and is outputted to an optical transmission line 5B on the output side. Thus, the optical amplification apparatus 1 may be referred to as an optical amplification repeater 1. A rare-earth doped optical fiber may be applied to the optical amplification media 11 and 12. A non-limiting example of the rare-earth doped optical fiber includes an erbium-doped optical fiber (EDF).

Excitation light which is outputted from an excitation light source 13 being branched by the optical branching device 14 and the branched excitation light being inputted, EDFs 11 and 12 are each excited to amplify signal light. Signal light may be exemplarily WDM light which is multiplexed signal light having a plurality of wavelengths. A semiconductor laser diode (LD) may be applied to the excitation light source 13. A non-limiting example of a semiconductor LD is a Fabry-Perot (FP) laser which emits light including a plurality of wavelengths. A FP laser is less expensive than a distributed feedback laser (DFB) capable of light-emitting a single wavelength in a stable manner.

The optical branching device 14 branches excitation light inputted from the excitation light source 13 to two branches of light, for example, and inputs one branched excitation light to the EDF 11 through a multiplexer 17 provided on a front stage of the one EDF 11. In addition, the optical branching device 14 inputs the other branched excitation light to the EDF 12 through a multiplexer 18 provided on a front stage of the other EDF 12.

Stated differently, the branched excitation light on the one side is multiplexed to signal light which is inputted to the EDF 11 at the multiplexer 17 and inputted to the EDF 11 together with the signal light. In addition, the branched excitation light on the other side is multiplexed to signal light which is inputted to the EDF 12 at the multiplexer 18 and inputted to the EDF 12.

Thus, the EDFs 11 and 12 each have a so-called forward pumping configuration that excitation light is inputted from a same direction as a transmission direction of input signal light to be amplified. However, one or both of the EDFs 11 and 12 may have a backward pumping configuration or a two-way pumping configuration. In the case of the two-way pumping configuration, the number of branches of excitation light is larger than the case of the forward or backward pumping configuration.

In addition, as exemplarily illustrated in FIG. 1, a gain equalizer (GEQ) or a variable optical attenuator (VOA) 16 may be provided, as appropriate, between the EDF 11 and the EDF 12. The EDFs 11 and 12 has a gain characteristic, referred to as a gain deviation or a gain tilt, which is wavelength dependent. Thus, when WDM light is amplified by the EDFs 11 and 12, the optical amplification apparatus 1 may be provided with the GEQ 15 to compensate (which may also be referred to as "flattening") power deviations among wavelengths due to a gain tilt.

For example, the GEQ 15 performs output power adjustment to offset any inter-wavelength power difference which occurs in WDM light due to a gain tilt which the EDF 12 on the subsequent stage has, on WDM light outputted from the EDF 11 on the front stage. A filter such as a dielectric multi-layer filter or an etalon filter may be applied to the GEQ 15. Thus, the GEQ 15 may be referred to as a "gain equalization filter". Note that the VOA 16 adjusts power of WDM light outputted from the GEQ 15 to adjust input light power to the EDF 12.

A gain equalization characteristic of the GEQ 15 and an attenuation amount of the VOA 16 (which may be referred to as "VOA loss") may be dynamically adjusted (controlled) based on input/output power of each of the EDFs 11 and 12. Thus, as exemplarily illustrated in FIG. 1, the optical amplification apparatus 1 may be provided with an optical branching device 19 and a light receiving element 20 as an example of a monitor system on an input/output stage of the EDF 11 or an input/output stage of the EDF 12.

The optical branching device 19 inputs branched WDM light to the light receiving element 20 as monitor light. The light receiving element 20 is exemplarily a photodiode (or a photo detector) (PD), and outputs an electric signal corresponding to light receiving power of the monitor light. Based on the electric signal, the gain equalization characteristic of the GEQ 15 and the attenuation amount of the VOA 16 may be controlled. Note that a control unit which performs the control is not illustrated in FIG. 1.

Figure 2:
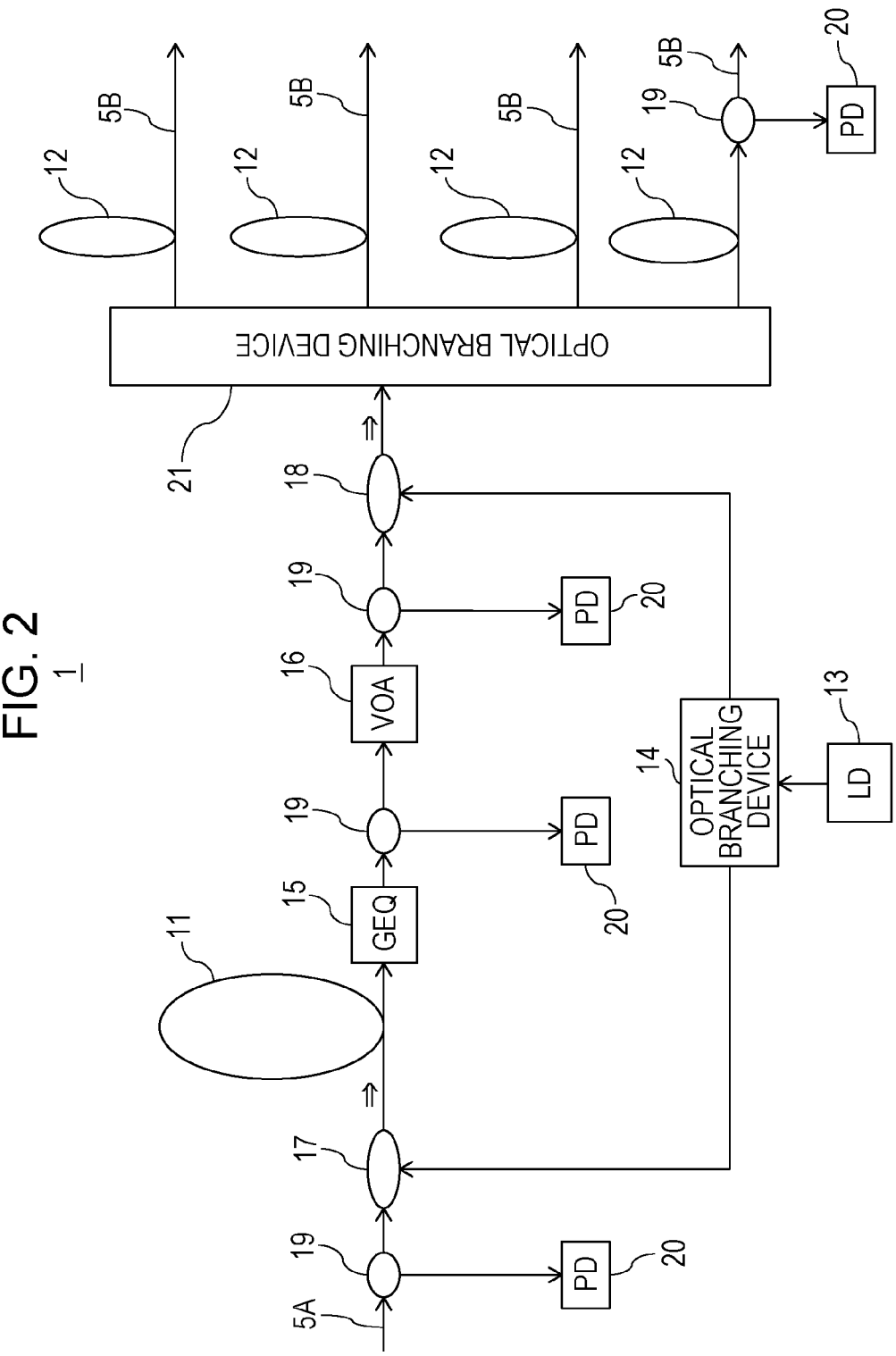
FIG. 2 is a block diagram illustrating a configuration example of an optical amplification apparatus wherein excitation light branched by an optical branching device exemplarily illustrated in FIG. 1 is multicast.
Figure 3:
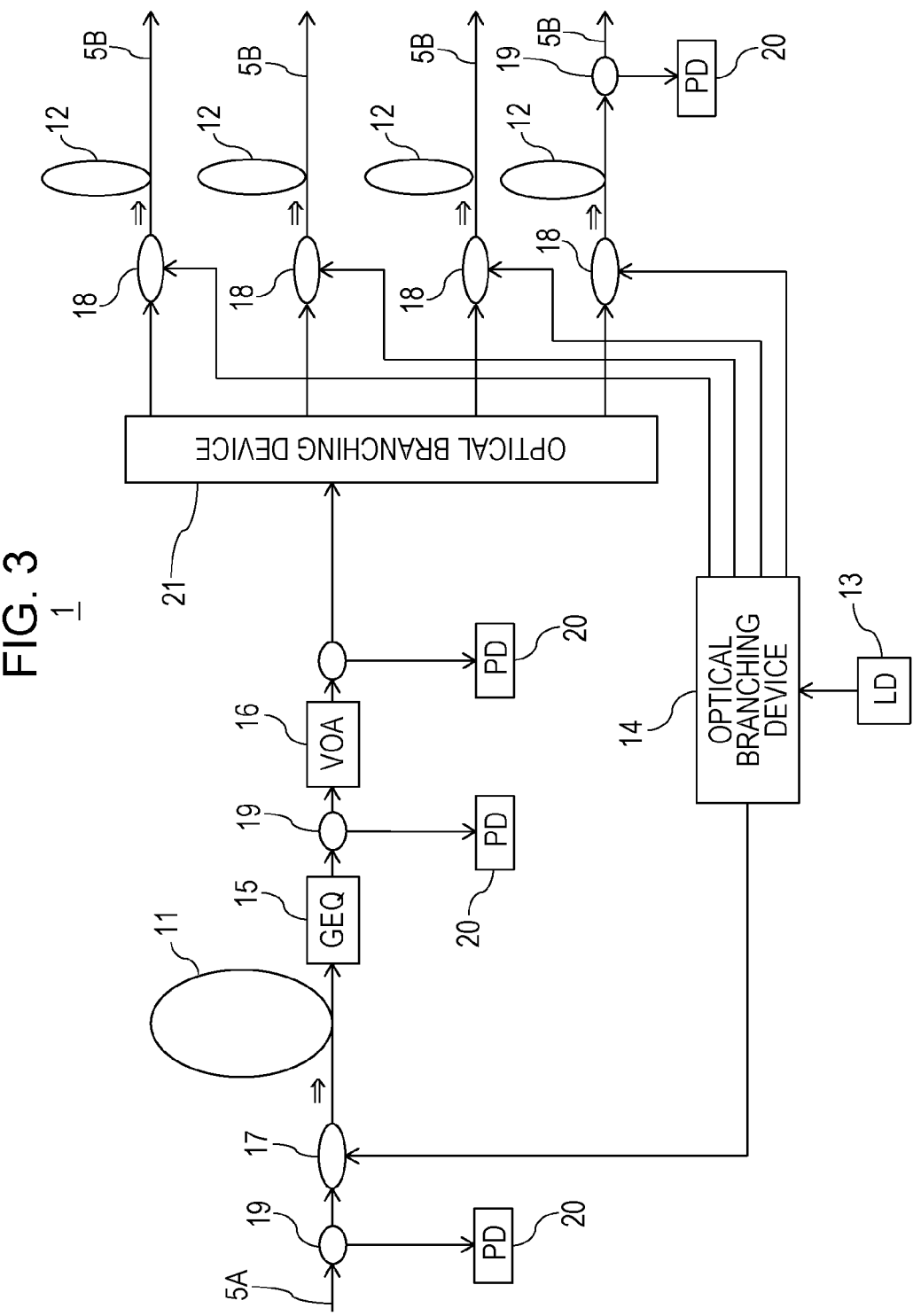
FIG. 3 is a block diagram illustrating a configuration example of an optical amplification apparatus wherein excitation light branched by the optical branching device exemplarily illustrated in FIG. 1 is multicast.

Note that of branched excitation light branched at the optical branching device 14, branched excitation light which is not branched excitation light to be inputted to the EDF 11 may be inputted (which may be referred to "multicast") to a plurality of the EDFs 12. FIG. 2 and FIG. 3 illustrate one example thereof. FIG. 2 and FIG. 3 illustrate a configuration example of the optical amplification apparatus 1 wherein branched excitation light is introduced to four EDFs 12. Note that the number of the EDFs 12 is not limited to four and may be two or more.

An optical amplification apparatus 1 exemplarily illustrated in FIG. 2 includes, on the subsequent stage of the multiplexer 18, an optical branching device 21 configured to branch output light of the multiplexer 18 to each EDF 12. Thus, of branched excitation light branched at the optical branching device 14, branched excitation light which is not branched excitation light to be inputted to an EDF 11 is inputted to the optical branching device 21 through the multiplexer 18 together with WDM light, branched at the optical branching device 21 together with the WDM light, and introduced to each of the EDFs 12.

The optical branching device 21 may equally branch WDM light which is input light and branched excitation light and equally distribute the WDM light which is input light and the branched excitation light to each of the EDFs 12, or unevenly distribute WDM light which is input light and branched excitation light at different branching ratios to each of the EDFs 12. In addition, the branching ratio at the optical branching device 21 may be fixed or variable.

On the one hand, an optical amplification apparatus 1 illustrated in FIG. 3 has such a configuration that each optical route (which may also be referred to as a "branched route") from an optical branching device 21 to each EDF 12 is provided with a multiplexer 18 and branched excitation light is individually introduced to each EDF 12 through each multiplexer 18. In this case, the number of excitation light branches at an optical branching device 14 is changed depending on the number of EDFs 12 to be multicast.

Note that while in FIG. 2 and FIG. 3, one EDF 12 of the four EDFs 12 is provided with the optical branching device 19 and the light receiving element 20 which constitute one example of an output light monitor, each of two or more EDFs 12 may be provided with an output light monitor.

Incidentally, as described above, when excitation light is branched at the optical branching device 14 and supplied to each of the EDFs 11 and 12, output light power of a common excitation light source 13 is desirable to be adjusted in order to adjust a gain corresponding to input light power to the EDFs 11 and 12.

Here, if a branching ratio of the optical branching device 14 is fixed, the power of the branched excitation light fluctuates only uniformly even if the output light power of the excitation light source 13 is adjusted. Thus, the power of the branched excitation light may not be individually adjusted, which makes it difficult to compensate a gain tilt.

Note that a gain tilt which the EDFs 11 and 12 have may vary depending on not only fluctuations in input light power but also ambient temperatures. Stated differently, even when input light power to the EDFs 11 and 12 is uniform, the gain tilt may vary depending on a change in the ambient temperatures of the EDFs 11 and 12.

Fluctuations of the temperature-dependent gain tilt may be compensated through uniform control of the ambient temperatures of the EDFs 11 and 12 by using a heater. In addition, fluctuations of temperature-dependent gain tilt may also be compensated through provision of a temperature sensor configured to sense the ambient temperatures of the EDFs 11 and 12 to adjust excitation light power depending on sensed temperatures.

If a branching ratio of the optical branching device 14 is fixed, compensation of a gain tilt as described above becomes difficult even if the excitation light power is adjusted depending on a temperature. Therefore, it is preferable that a branching ratio of excitation light at the optical branching device 14 is variable.

Figure 4:
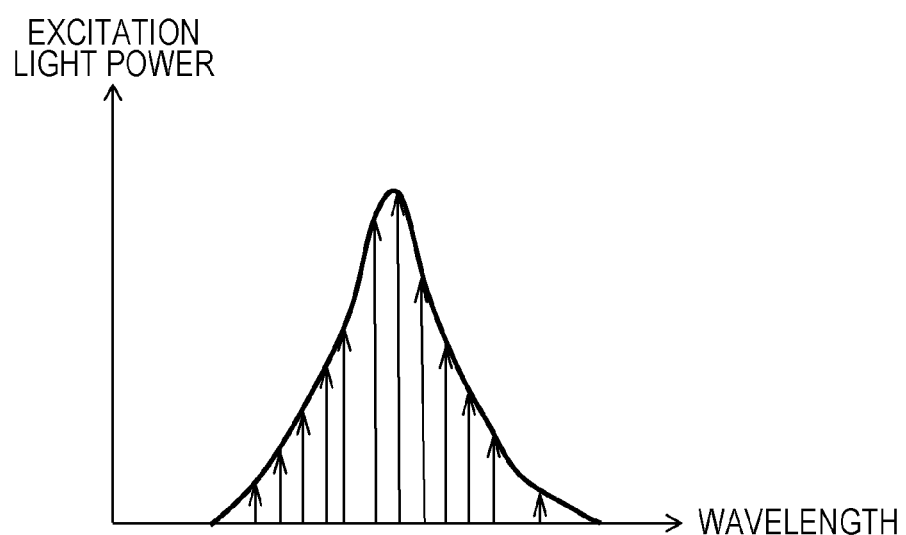
FIG. 4 is a view illustrating an example of a characteristic of excitation light power to a wavelength.

However, as schematically and exemplarily illustrated in FIG. 4, when an FP laser is used for the excitation light source 13, excitation light includes a plurality of wavelengths and power and a polarized wave state (which may also be referred to as "polarization mode") of each wavelength may also fluctuate easily.

Thus, when the FP laser is used for the excitation light source 13, it is difficult to make a branching ratio of excitation light variable by using an interference method at the optical branching device 14, unlike when a DFB is used.

As an example of a technique to make a branching ratio of excitation light variable, a technique to use polarized wave is possible, instead of the interference method. For example, it is envisioned that a laser by which polarized wave is uniform (exemplarily, linear polarized wave) and does not fluctuate even though wavelengths included in output light fluctuate is applied to the excitation light source 13.

In this case, if a polarization beam splitter (PBS) having azimuth of 45 degrees to a polarization plane which does not fluctuate is used, excitation light may be branched at a branching ratio of 1:1. Stated differently, the branching ratio of the excitation light may be changed by causing the polarization plane of the excitation light to relatively change with respect to the azimuth of the PBS.

Figure 5:
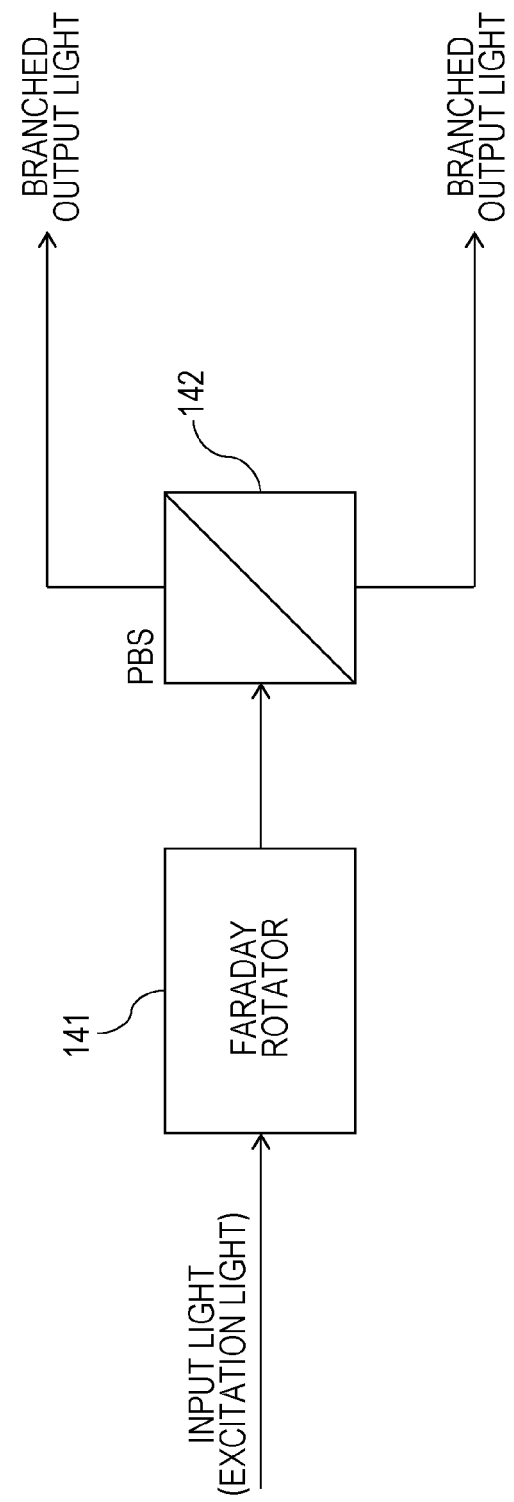
FIG. 5 is a block diagram illustrating a configuration example of the optical branching device exemplarily illustrated in FIG. 1 to FIG. 3.

A Faraday rotator is a non-limiting example of an optical device capable of changing a polarization plane of excitation light. FIG. 5 illustrates a configuration example of an optical branching device 14 using a Faraday rotator. The optical branching device 14 illustrated in FIG. 5 exemplarily includes a Faraday rotator 141 and a PBS 142.

The Faraday rotator 141 rotates a polarization plane of input light (here, exemplarily, excitation light) by utilizing a phenomenon referred to as the Faraday effect that a polarization plane rotates, when linear polarization parallel to a magnetic field is transmitted through a material. For example, the Faraday rotator 141 may control polarized wave of input light depending on a change in a magnetic field to be provided. A garnet single-crystal film may be used for the Faraday rotator 141 as a non-limiting example. Exemplarily, insertion loss of the Faraday rotator 141 is approximately 0.02 to 0.05 dB which corresponds to about one splice.

The PBS 142 separates by a polarized wave component the light which is transmitted through the Faraday rotator 141 and outputs branched excitation light. In response to changing of the magnetic field of the Faraday rotator 141 (stated differently, magnetic flux density applied to the Faraday rotator 141), a polarization plane of excitation light, which is an example of input light, rotates. Thus, the polarization plane of the excitation light with respect to azimuth of the PBS 142 relatively changes, and the branching ratio of the excitation light at the PBS 142 changes.

Note that the configuration of the optical branching device 14 exemplarily illustrated in FIG. 5 is useful when a polarization plane of each wavelength of excitation light, which is output light of the excitation light source 13, is uniform without fluctuating. However, when the polarization plane of each wavelength of the excitation light temporally fluctuates, with a simple PBS utilizing the Brewster law (which may also be referred to as a "Brewster splitter"), the branching ratio changes depending on the fluctuation of the polarization plane.

Figure 6:
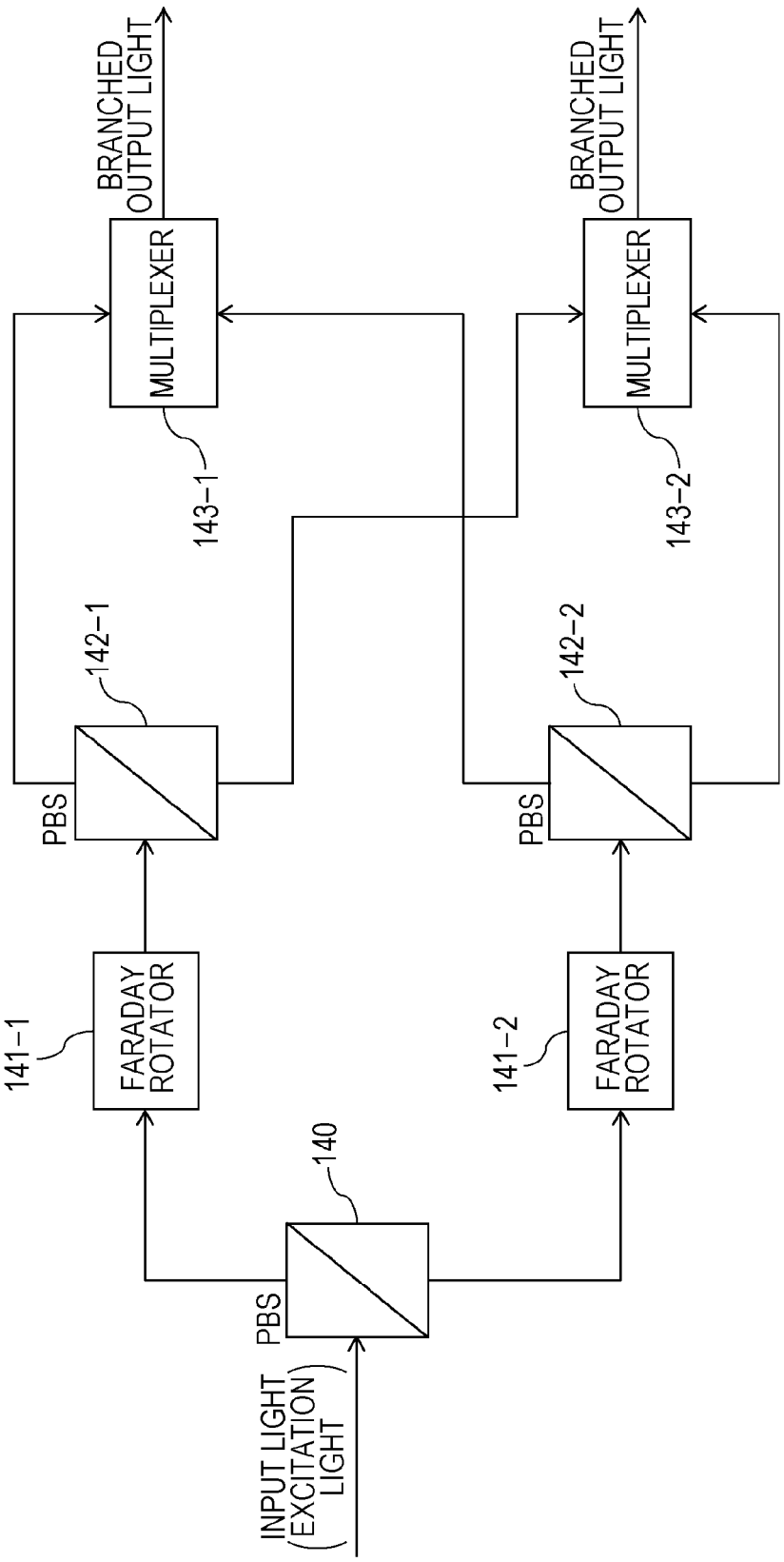
FIG. 6 is a block diagram illustrating another configuration example of the optical branching device exemplarily illustrated in FIG. 1 to FIG. 3.

Thus, a configuration exemplarily illustrated in FIG. 6 may be applied to the optical branching device 14 when the polarization plane of each wavelength of the excitation light temporally fluctuates. An optical branching device 14 illustrated in FIG. 6 exemplarily includes a PBS 140, two Faraday rotators 141-1 and 141-2, two PBSs 142-1 and 142-2, and two multiplexers 143-1 and 143-2.

The PBS 140 separates excitation light, which is output light of an excitation light source 13, by a polarized wave component, and inputs light of one polarized wave component to one Faraday rotator 141-1 and light of the other polarized wave component to the other Faraday rotator 141-2. In addition, it may be considered that the PBS 140 corresponds to a second PBS when the PBSs 142-1 and 142-2 are positioned as a plurality of first PBSs.

Similar to the Faraday rotator 141 exemplarily illustrated in FIG. 5, each of the Faraday rotators 141-1 and 141-2 utilizes the Faraday Effect to rotate a polarization plane of excitation light. Note that when the Faraday rotator exemplarily illustrated in FIG. 5 is not distinguished from the Faraday rotators 141-1 and 141-2 exemplarily illustrated in FIG. 6, the Faraday rotator is simply described as a "Faraday rotator 141".

The light which is transmitted through the one Faraday rotator 141-1 enters the one PBS 142-1, and the light which is transmitted through the other Faraday rotator 141-2 enters the other PBS 142-2.

The one PBS 142-1 branches (which may also be referred to as "separates") by a polarized wave component the light which entered from the Faraday rotator 141-1. One (first) polarized wave component of the separated polarized wave components enters the one (first) multiplexer 143-1 and the other (second) polarized wave component enters the other (second) multiplexer 143-2.

Similarly, the other PBS 142-2 separates by a polarized wave component the light which enters from the Faraday rotator 141-2. The one (first) polarized wave component of the separated polarized wave components enters the one (first) multiplexer 143-1 and the other (second) polarized wave component enters the other (second) multiplexer 143-2.

The first multiplexer 143-1 multiplexes and outputs light of the one polarized wave component which is entered from each of the PBSs 142-1 and 142-2.

Similarly, the second multiplexer 143-2 multiplexes and outputs light of the other polarized wave component which is entered from each of the PBSs 142-1 and 142-2.

As such, by separating excitation light by a polarized wave component, Faraday-rotating a polarization plane by the polarized wave component, and then further performing separation and multiplexing by the polarized wave component, even if the polarization plane or spectrum of the excitation light temporally fluctuates, the fluctuations may be averaged and minimized. Therefore, a stable branching ratio may be implemented at the optical branching device 14.

In the optical branching device 14 of the configuration exemplarily illustrated in FIG. 5 or FIG. 6, a branching ratio may be adjusted by adjusting a magnetic field to be provided to the Faraday rotator 141. If the magnetic field of the Faraday rotator 141 may be caused to change passively in response to temperature in the magnetic field of the Faraday rotator 141, the branching ratio of excitation light may be changed without active control of the optical branching device 14. If the active control may be dispensed with, power feeding for control of the branching ratio may be dispensed with.

With application to the optical amplification repeater 1 of the optical branching device 14 for which power feeding is dispensed with and the branching ratio of excitation light is variable depending on a temperature, as exemplarily illustrated in FIG. 1 to FIG. 3, temperature-dependent changes in the gain tilt of the EDFs 11 and 12 may be autonomously corrected (which may also be referred to as "compensated").

Here, the excitation light source 13 exemplarily illustrated in FIG. 1 to FIG. 3 may be positioned in an end station and not in the optical amplification repeater 1, and the EDFs 11 and 12 of the optical amplification repeater 1 may be excited by excitation light received remotely (from the end station, for example). Such an excitation may be referred to as "remote excitation" and excitation light used in the remote excitation may be referred to as "remote excitation light".

With the remote excitation, power feeding to the excitation light source 13 may be dispensed with in the optical amplification repeater 1, in addition to the power feeding for control of the branching ratio of the excitation light. Therefore, power feeding equipment or laying of a power cable and the like for the optical amplification repeater 1 may be dispensed with.

Stated differently, with the remote excitation, since an active component such as an excitation light source and the like may be disused in the optical amplification repeater 1, a passive component may constitute the optical amplification repeater 1, which may thus lead to disuse of the power feeding equipment. Since the power feeding equipment may be disused, at a way point where the optical amplification repeater 1 is installed, a space may be saved and maintenance work may be facilitated or simplified.

In addition, since the active component may be disused, increase in a failure ratio of the optical amplification repeater 1 and thus an optical transmission system using the optical amplification repeater 1 may be substantially reduced. Stated differently, stable operation (reliability) of the optical amplification repeater 1 and thus the optical transmission system may be considerably improved.

Accordingly, a degree of freedom for an installation place of the optical amplification repeater 1 improves, and the optical amplification repeater 1 may be laid under the ground, not in such a managed environment as in a building, for example.

Incidentally, an example of a controller having a structure (or a mechanism) which may passively change the magnetic field to be provided to the Faraday rotator 141 depending on a temperature may include a structure using a permanent magnet and a member configured to deform depending on a temperature. A member configured to deform depending on a temperature may be referred to as a "temperature-dependent deforming member".

For example, a relative positional relationship of the Faraday rotator 141 and the magnet which provides the Faraday rotator 141 with the magnetic field is changed by using force accompanying deformation of the temperature-dependent deforming member depending on a temperature. With this, the magnetic field provided to the Faraday rotator 141 may be passively changed depending on a temperature.

Figure 7:
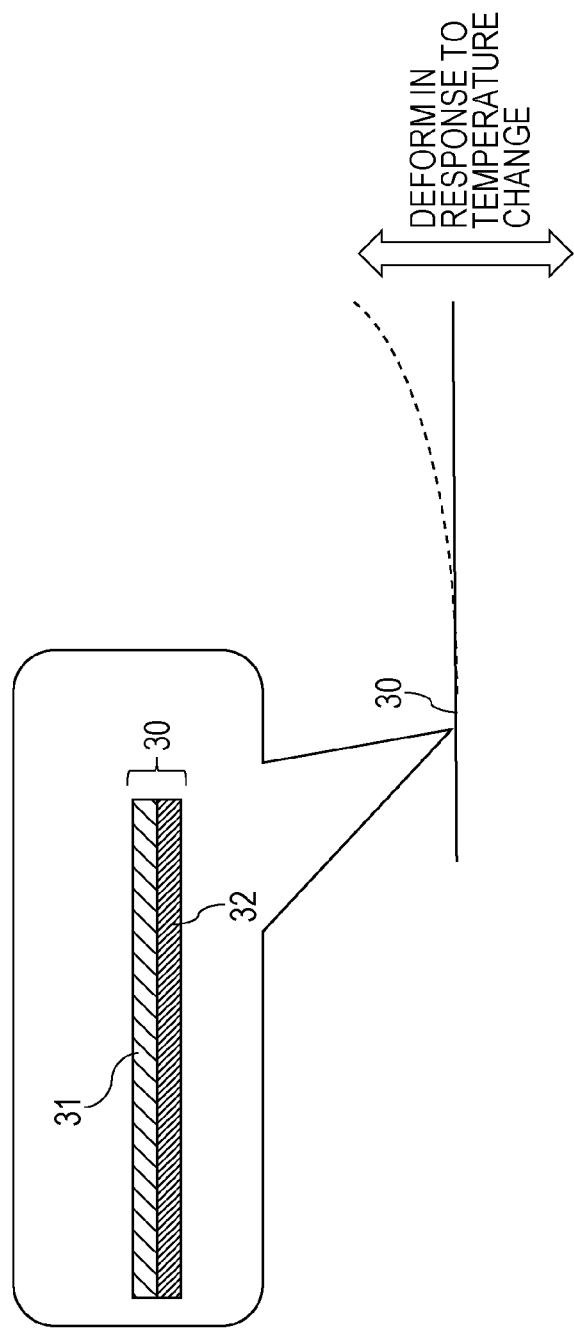
FIG. 7 is a view schematically illustrating a configuration example of a bimetal used in the optical branching device exemplarily illustrated in FIG. 5 and FIG. 6.

A non-limiting example of the temperature-dependent deforming member is a bimetal. As schematically and exemplarily illustrated in FIG. 7, the bimetal is a member made by laminating metal plates 31 and 32 having different thermal expansion coefficients. As temperature rises higher, the metal plate 31 or 32 having a larger rate of thermal expansion expands more. Consequently, "bending" (or "warping") occurs in the bimetal 30. Such force accompanying the deformation in response to a temperature change may be used to change a relative position of the Faraday rotator 141 and the magnet.

When an electromagnet is used, power is desirable to be fed to the magnet. Thus, a "permanent magnet" capable of maintaining properties as a magnet even without receiving a magnetic field or supply of currents from outside may be used. A non-limiting example of a permanent magnet includes an alnico magnet, a ferrite magnet, a neodymium magnet and the like.

Figure 8:
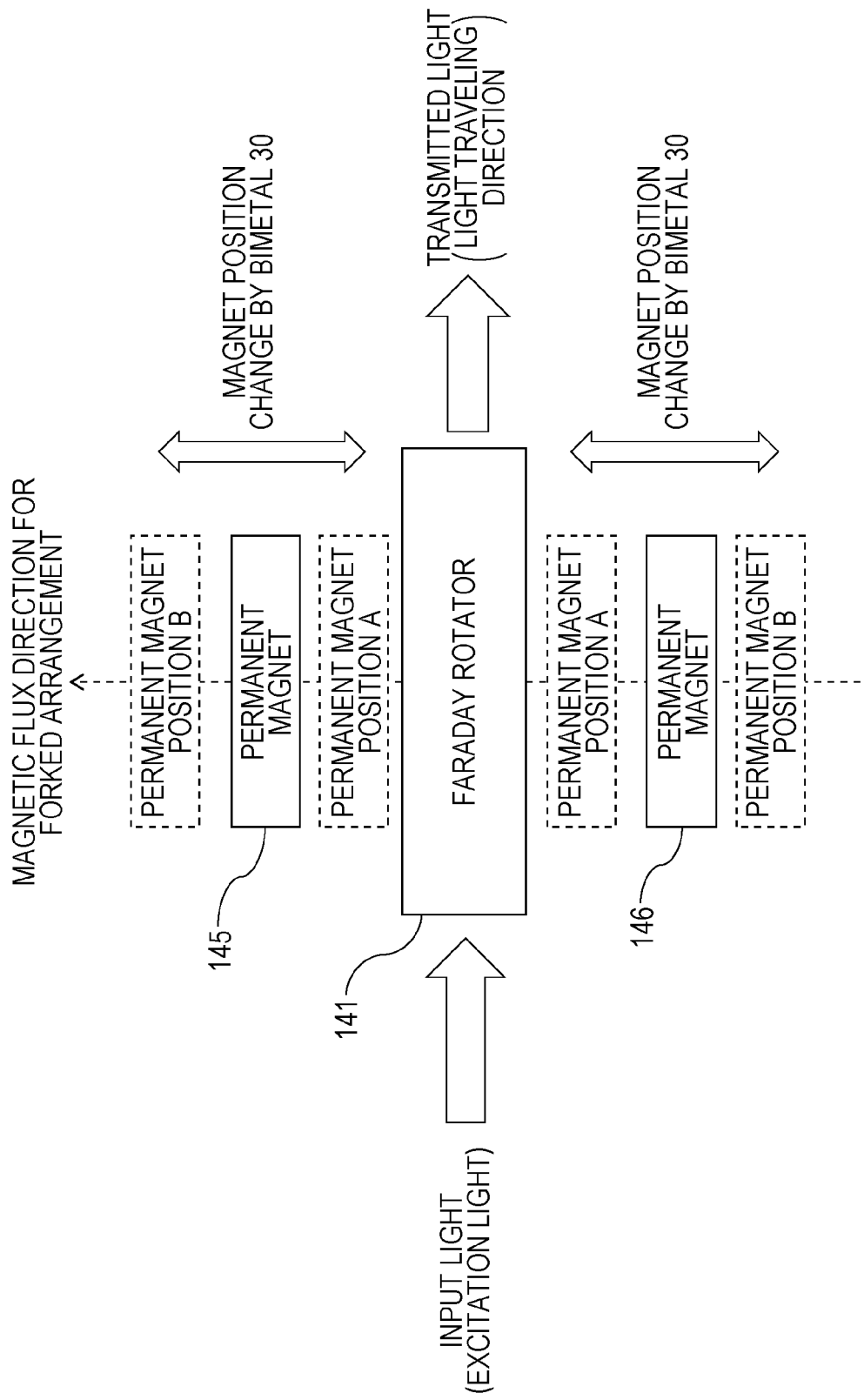
FIG. 8 is a view illustrating an example of arrangement (forked arrangement) of a Faraday rotator and a permanent magnet which constitute one example of the optical branching device exemplarily illustrated in FIG. 5 and FIG. 6.

FIG. 8 illustrates an example of arrangement of Faraday rotator 141 and permanent magnets 145 and 146 which are used in an optical branching device 14. The arrangement illustrated in FIG. 8 is an arrangement referred to forked arrangement in which a light travelling direction is orthogonal to a magnetic flux direction, and the Faraday rotator 141 having light being transmitted in a direction orthogonal to the magnetic flux is positioned between the two permanent magnets 145 and 146.

Then, by using the force accompanying the deformation of the bimetal 30 in response to a temperature change and changing a position(s) of one or both of the permanent magnets 145 and 146 with respect to the Faraday rotator 141, the magnetic field of the Faraday rotator 141 may be changed in response to the temperature change. Therefore, the optical branching device 14 to which no power is desirable to be fed and in which the branching ratio is variable in response to the temperature change may be implemented.

In addition, the angle of rotation a by the Faraday effect may be obtained with the following expression (1) where H represents intensity of a magnetic field, L length of a material through which polarized light is transmitted, V the Verdet's constant:

$$\alpha = VHL \quad (1)$$

Note that the Verdet's constant V is a proportionality constant specific to a material through which polarized light is transmitted, and depends on a type of a material, a wavelength of polarized light, and a temperature.

Here, suppose that a terbium-gallium-garnet is used for the Faraday rotator 141 and the Verdet's constant of the terbium-gallium-garnet is 0.13 min/Oe/cm. In this case, the intensity of the magnetic field H sufficient to rotate a polarization plane by 45 degrees ($\alpha=45°$) by the Faraday Effect of the Faraday rotator 141 having the length L=2 [cm] in a direction in which light is transmitted is H=45×60/0.13/2=10384G [gauss] =1.0384T [tesla].

If the length L of the Faraday rotator 141 is extended, the intensity of the magnetic field sufficient to obtain the same angle of rotation $\alpha$ may be reduced. For example, if the length L of the Faraday rotator 141 is doubled to 4 cm, the intensity of the magnetic field H sufficient to rotate the polarization plane by 45 degrees ($\alpha=45°$) may be controlled to half of the above.

Controller Having a First Structure Example of Changing a Permanent Magnet Position A controller having a specific example of a structure (or a mechanism) configured to change positions of permanent magnets 145 and 146 by using force accompanying deformation in response to a temperature change of bimetal 30 is described hereinafter with reference to FIG. 9.

Figure 9:
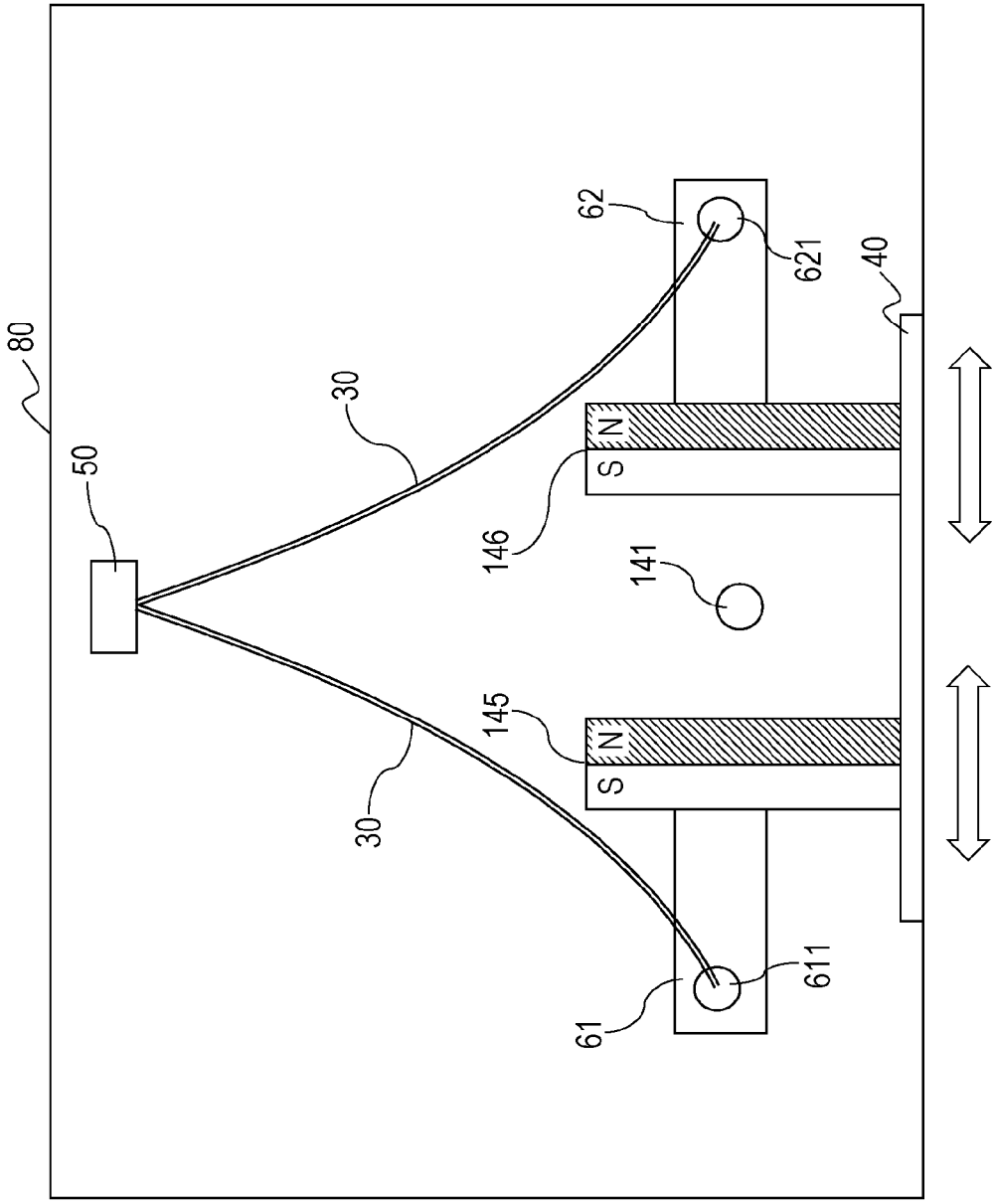
FIG. 9 is a view schematically illustrating one example of a controller having a structure which allows changing of a position with respect to the Faraday Rotator of the permanent magnet exemplarily illustrated in FIG. 8.

A controller exemplarily illustrated in FIG. 9 is a controller having a structure in which the bimetal 30 is attached to each of support members 61 and 62 which are fixed to the permanent magnets 145 and 146.

The permanent magnets 145 and 146 are each arranged in an opposed manner so that a magnetic field is uniformly applied to the Faraday rotator 141. The permanent magnets 145 and 146 may be placed in a movable mechanism 40 so that with the opposed arrangement being maintained, a position (distance) with a respect to the Faraday rotator 141 may change. An example of the movable mechanism 40 is a guide rail.

Stated differently, the permanent magnets 145 and 146 may be slidably placed in a direction along the guide rail 40 while maintaining uniformity of the magnetic field applied to the Faraday rotator 141. A material which does not cause disturbance in the magnetic field such as a material having same magnetic permeability as air may be used.

Sliding of the permanent magnets 145 and 146 along the guide rail 40 is caused by transmission to the support members 61 and 62 of the force corresponding to the deformation of the bimetals 30 attached to the support members 61 and 62. Thus, the bimetals 30 may be designed to have thickness which only generates force sufficient to slide the permanent magnets 145 and 146 due to the deformation.

One end of each bimetal 30 is fixed by a fixing member 50 and the other end of each bimetal 30 is connected to movable link mechanisms 611 and 612 provided at the support members 61 and 62. The fixing member 50 may be exemplarily fixed to the bimetals 30, the guide rail 40, the support members 61 and 62, and a housing 80 which houses the permanent magnets 145 and 146. For example, as illustrated in FIG. 9, the fixing member 50 may be fixed onto an inner top surface of the housing 80. The guide rail 40 may be fixed onto an inner bottom surface of the housing 80.

The movable link mechanisms 611 and 612 are each an example of a mechanism capable of rotating at a free angle with a position where the bimetal 30 is attached as a supporting point, for example, so that the force corresponding to the deformation of the bimetal 30 may be converted into force in a direction along the guide rail 40.

With the controller having the structure described above, the positions of the permanent magnets 145 and 146 with respect to the Faraday rotator 141 may be changed through the use of the force which is generated accompanying the deformation of the bimetal in response to a temperature change, as exemplarily illustrated in FIG. 8.

Controller Having a Second Structure Example of Changing a Permanent Magnet Position Note that while the afore-mentioned example is an example using the bimetal 30 as a temperature-dependent deforming member, the temperature-dependent deforming member may be single metal or alloy. However, for the single metal or the alloy, since deformation in response to a temperature change is smaller than the bimetal 30, amount of displacement to be obtained corresponding to the deformation is smaller than the bimetal 30.

Figure 10:
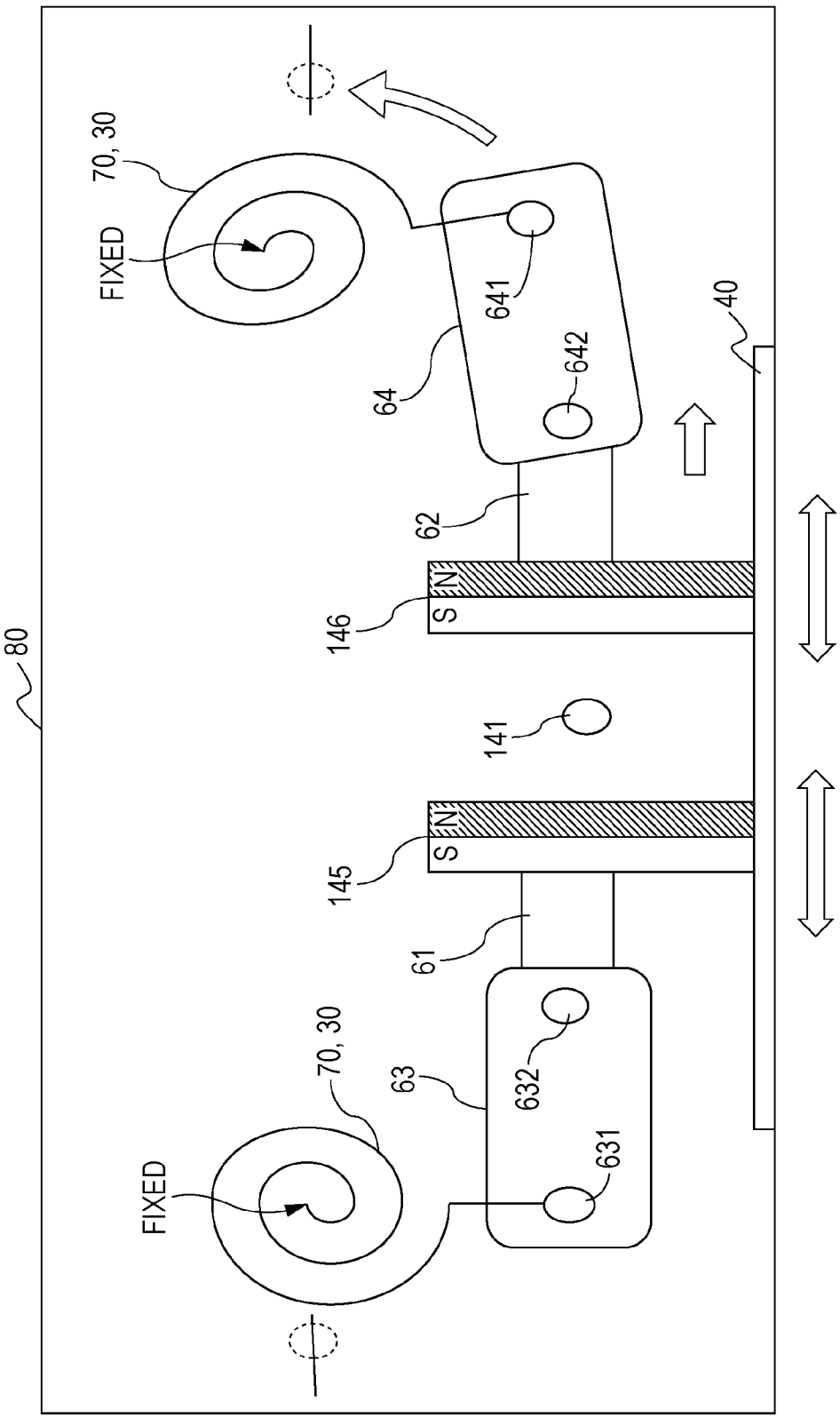
FIG. 10 is a view schematically illustrating one example of a controller having another structure which allows changing of a position with respect to the Faraday Rotator of the permanent magnet exemplarily illustrated in FIG. 8.

In order to obtain the amount of displacement corresponding to the deformation which is equivalent to the bimetal 30, also with the single metal or the alloy, metal plates 70 of the single metal or the alloy may be treated to be spiral, as schematically illustrated in FIG. 10. The spiral metal plates 70 expand and shrink in a diametrical direction in response to a temperature change. Thus, the spiral metal plates 70 may ensure larger amount of displacement in the diametrical direction than metal plates 70 in the form of plates do.

If the displacement in the diametrical direction is converted to displacement in the direction along the guide rail 40, for example, the permanent magnets 145 and 146 may be slid along the guide rail 40, similar to the configuration exemplarily illustrated in FIG. 9. In order to convert the displacement in the diametrical direction to displacement in the direction along the guide rail 40, crank members 63 and 64 may be used as exemplarily illustrated in FIG. 10.

The crank member 63 (64) includes movable link mechanisms 631 and 634 (641 and 642), and is rotatable with the movable link mechanisms 631 and 634 (641 and 642) as a supporting point. The support member 61 fixed to the one permanent magnet 145 is attached to the one movable link mechanism 631 (641). One end of the spiral metal plate 70 is attached to the other movable link mechanism 632 (642). The other end of the spiral metal plate 70 is fixed by a fixing member which is not illustrated. The fixing member may be exemplarily fixed to the housing 80.

In the controller having the structure example described above, when the spiral metal plate 70 expands or shrinks to the diametrical direction in response to a temperature change, the crank member 63 (64) responds to the expansion or shrinkage and rotates with the movable link mechanism 632 (643) of the crank member 63 (64) as a supporting point. Force in the direction along the guide rail 40 acting on the support member 61 (62) in response to the rotation, the permanent magnet 145 (146) slides along the guide rail 40.

As such, similar to the controller exemplarily illustrated in FIG. 9, the positions of the permanent magnets 145 and 146 with the respect to the Faraday rotator 141 may be changed through the use of the deformation of the metal plate 70 in response to a temperature change. Note that the spiral metal plate 70 exemplarily illustrated in FIG. 10 may be replaced by the bimetal 30. Stated differently, the bimetal 30 exemplarily illustrated in FIG. 9 may be treated to be spiral and applied to the similar structure to FIG. 10.

Usage as a VOA of the Optical Branching Device 14

In addition, the afore-mentioned temperature-dependent optical branching device 14 with the variable branching ratio may be used as a variable optical attenuator (VOA) having amount of loss which varies in response to a temperature change. For example, one of two beams of branched output light, which is obtained in the configuration illustrated in FIG. 5 or FIG. 6, is used, while the other is not used.

For the branched output light which is not unused, the amount of loss varies since the branching ratio at the optical branching device 14 changes in response to a temperature change. Therefore, the optical branching device 14 may be used as a temperature-dependent VOA. Note that the optical branching device 14 which is used as a VOA may be hereinafter designated as a "VOA 14a" for convenience.

The VOA 14a may be used as a replacement for the VOA 16 exemplarily illustrated in FIG. 1 to FIG. 3. If the VOA 14a is used in place of the VOA 16, a gain of the EDFs 11 and 12 may be autonomously adjusted in response to a temperature change.

Example of Application to an Optical Amplification Repeater 1

Figure 11:
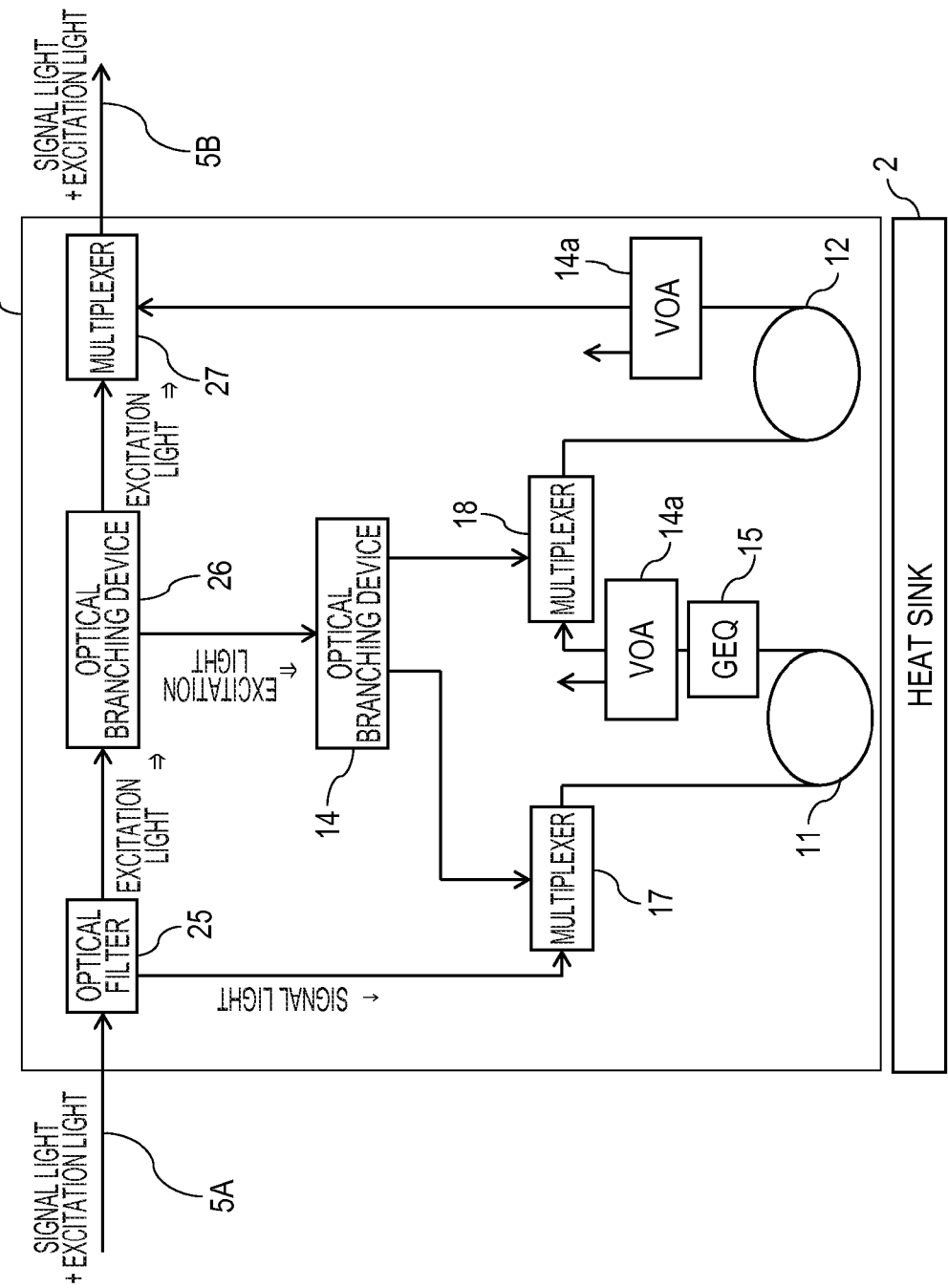
FIG. 11 is a block diagram illustrating a configuration example of an optical amplification repeater which uses the optical branching device exemplarily illustrated in FIG. 5 to FIG. 10.

FIG. 11 illustrates a configuration example of an optical amplification repeater 1 using the optical branching device 14 and the VOA 14a described above. The optical amplification repeater 1 illustrated in FIG. 11 exemplarily has such a configuration that excitation light is received with signal light through an optical transmission line 5A and that EDFs 11 and 12 are remotely excited by the excitation light. Note that the optical transmission line 5A is an optical fiber transmission line, for example.

Thus, as illustrated in FIG. 11, for example, the optical amplification repeater 1 may not be provided with the excitation light source 13 exemplarily illustrated in FIG. 1 to FIG. 3, and includes an optical filter 25, an optical branching device 26, and a multiplexer 27. The optical amplification repeater 1 also includes the EDFs 11 and 12 which has already been described, a temperature-dependent branching-ratio variable optical branching device 14, two temperature-dependent VOAs 14a, a GEQ 15, and multiplexers 17 and 18.

The optical filter 25 separates signal light received from the optical transmission line 5 and excitation light, and outputs the signal light to the multiplexer 17 and the excitation light to the optical branching device 26.

The optical branching device 26 branches the excitation light inputted from the optical filter 25, and outputs the one branched excitation light to the temperature-dependent branching-ratio variable optical branching device 14 and the other branched excitation light to the multiplexer 27.

The temperature-dependent branching-ratio variable optical branching device 14 branches the excitation light inputted from the optical branching device 26 at a branching ratio depending on a temperature, and outputs the one branched excitation light to the multiplexer 17 and the other branched excitation light to the multiplexer 18.

The multiplexer 17 multiplexes the signal light inputted from the optical filter 25 and the excitation light inputted from the branching-ratio variable optical branching device 14, and inputs the multiplexed light to the EDF 11. With this, the signal light is amplified at the EDF 11 by the one branched excitation light branched at the branching-ratio variable optical branching device 14.

After being subjected to gain and power control by the GEQ 15 and the first VOA 14a provided on the subsequent stage of the EDF 11, the signal light amplified at the EDF 11 is inputted to the multiplexer 18.

The multiplexer 18 multiplexes the signal light inputted from the first VOA 14a and the other branched excitation light inputted from the branching-ratio variable optical branching device 14, and inputs the multiplexed light to the EDF 12. With this, the signal light is amplified at the EDF 12 by the other branched excitation light branched at the branching-ratio variable optical branching device 14.

After being subjected to power control by the second VOA 14a provided on the subsequent stage of the EDF 12, the signal light amplified at the EDF 12 is inputted to the multiplexer 27.

The multiplexer 27 multiplexes the excitation light inputted from the optical branching device 26 and the signal light inputted from the second VOA 14a, and outputs the multiplexed light to the optical transmission line 5B. Stated differently, after being used for amplification of the signal light by the EDFs 11 and 12, remote excitation light inputted to the optical amplification repeater 1 together with the signal light is transmitted to the downstream side through the multiplexer 27, together with the amplified signal light. Note that the optical transmission line 5B is an optical fiber transmission line, for example.

Therefore, when a plurality of optical amplification repeaters 1 are connected to an optical transmission system in multiple stages, remote excitation light may be shared by each optical amplification repeater 1. Note that if transmission (which may also be referred to as "relay") of the remote excitation light to the downstream side is dispensed with, the optical branching device 26 may be disused. For example, the excitation light separated by the optical filter 25 may be inputted to the branching-ratio variable optical branching device 14 without going through the optical branching device 26.

As described above, by branching the excitation light received with the signal light at the optical branching devices 26 and 14 and introducing the branched excitation light to the EDFs 11 and 12, the optical amplification repeater 1 may amplify the signal light with the remote excitation light.

Here, the excitation light is branched at a branching ratio depending on a temperature by the temperature-dependent branching-ratio variable optical branching device 14. Stated differently, the branching ratio of excitation light changes, following a temperature change. Thus, a gain tilt of the EDFs 11 and 12 is autonomously adjusted individually following the temperature change and compensation of the gain tilt is allowed. In addition, output light power of the EDFs 11 and 12 also follows the temperature change and may be autonomously adjusted by the temperature-dependent VOA 14a.

Furthermore, in the optical amplification repeater 1 exemplarily illustrated in FIG. 11, the EDFs 11 and 12, the optical filter 25, the optical branching devices 14 and 26, the multiplexers 17, 18 and 27, the VOA 14a, and a gain equalization filter 15, which is an example of the GEQ, are all passive components. Therefore, as described above, the power feeding equipment may be dispensed with and the gain tilt or the output light power of the EDFs 11 and 12 may be autonomously adjusted without power feeding equipment.

However, when a sharp temperature change occurs in the optical amplification repeater 1, autonomous adjustment may not follow. Thus, the optical amplification repeater 1 may be installed on a radiator (heat sink) 2, so that no sharp temperature change occurs.

Figure 12:
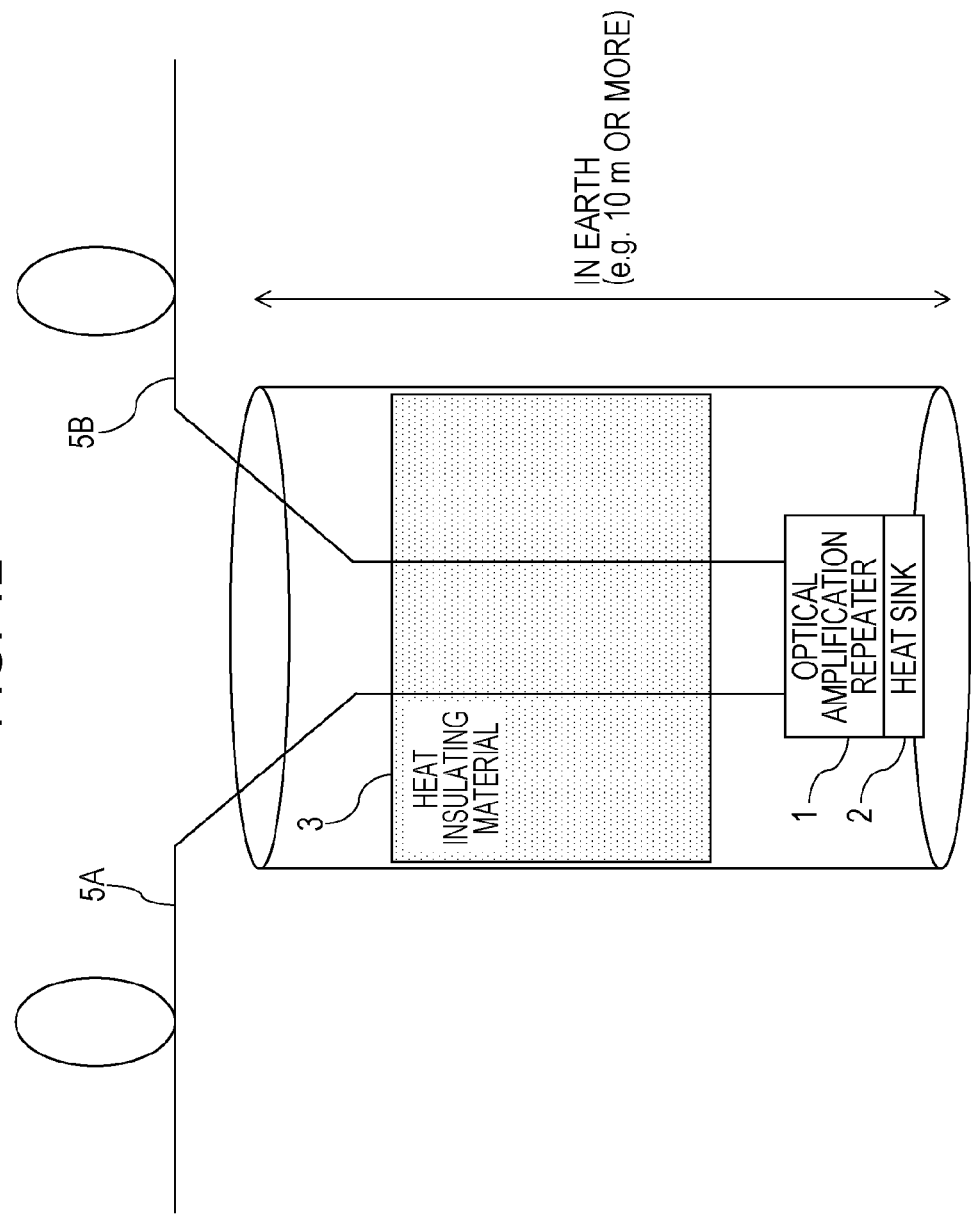
FIG. 12 is a view schematically illustrating how the optical amplification repeater exemplarily illustrated in FIG. 11 is laid under the ground.

Furthermore, in order to shield any heat from outside air, as schematically and exemplarily illustrated in FIG. 12, the optical amplification repeater 1 may be laid under the ground.

Depth of undergrounding may be such that heat exchange with the face of the earth is not substantially performed and a temperature is uniform throughout the year or loosely fluctuates even if it fluctuates. A non-limiting example of the depth of undergrounding is 10 m or more. In some cases, the thermal shield effect may be further improved by means of a heat insulating material 3.

As described above, in the afore-mentioned optical amplification repeater 1, since the power feeding equipment may be disused, an office provided with power feeding equipment may not be placed in the middle of an optical transmission section. Therefore, in a continent and the like where an optical transmission distance is long, the number of the optical amplification repeaters 1 to be installed may be reduced, which is highly useful.

Modification

In the optical amplification repeater 1 described above, temperature-dependent characteristic changes of the EDFs 11 and 12 may be compensated. However, if fluctuations in input/output level due to fluctuations in transmission line loss may be controlled as much as possible, a system capable of more stable optical transmission may be implemented.

The fluctuations in transmission line loss lead to power fluctuations of excitation light to be transmitted with signal light. For example, since excitation light power is stronger as the transmission line loss decreases, both signal light power and the excitation light power become strong. Thus, fluctuations in the output light power of the optical amplification repeater 1 easily becomes large, compared with a normal optical transmission system which does not use remote excitation light. In a system in which a plurality of optical amplification repeaters 1 are connected in multiple stages, fluctuations of the output light power easily increase in a cumulative manner.

Figure 13:
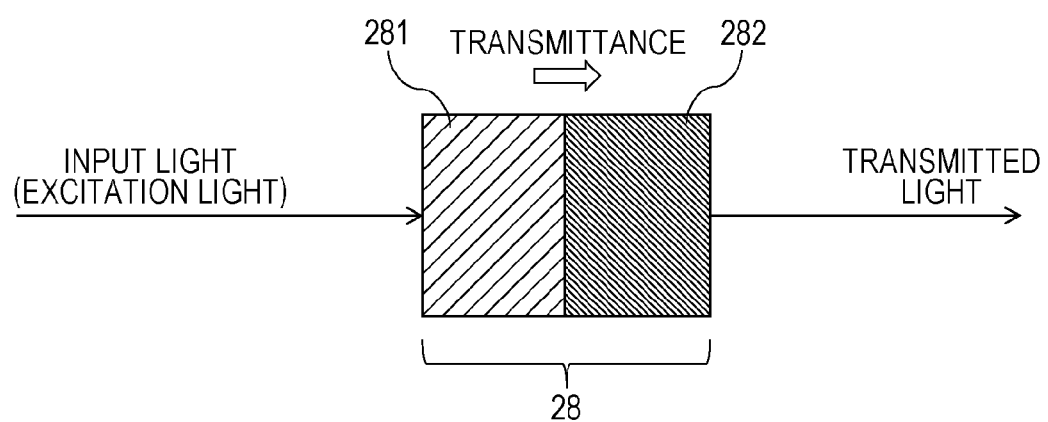
FIG. 13 is a view illustrating a configuration example of an optical limiter applicable to the optical amplification repeater exemplarily illustrated in FIG. 11.

In order to suppress the fluctuations in the excitation light power due to the fluctuations in the transmission line loss, an optical limiter having transmittance (stated differently, optical loss or optical reflectance) of light which varies depending on the input light power may be used. FIG. 13 illustrates a configuration example of an optical limiter which uses a waveguide medium. The optical limiter 28 illustrated in FIG. 13 is exemplarily a wavelength medium having a non-linear medium 281 and a linear medium 282.

The non-linear medium 281 is a medium with a refractive index (which may be referred to as a "non-linear refractive index") which varies depending on input light power and having input light transmitted at transmittance corresponding to the refractive index. The non-linear medium 281 is a medium having a greater non-linear effect (having a larger non-linear refractive index, stated differently) than the linear medium 282.

The linear medium 282 is a medium having a smaller non-linear refractive index than the non-linear medium 281 and arranged so that an entrance plane of light is parallel to an exit plane of light transmitted through the non-linear medium 281. The exit plane of the non-linear medium 281 and the entrance plane of the linear medium 282 constitute a boundary surface between the non-linear medium 281 and the linear medium 282.

Here, the non-linear refractive index n1 of the non-linear medium 281 may be expressed by a sum of the refractive index n of the non-linear medium 281 and a fluctuation component dxP of the refractive index n which depends on the input light power P (n1=n+dxP). Thus, the non-linear refractive index n1 of the non-linear medium 281 increases in response to increase of the input light power P.

When the refractive index of the linear medium 282 is expressed as n2, the reflectance of the optical limiter 28 is expressed as R, and the transmittance of the optical limiter 28 is expressed as T, respectively, the reflectance R of the optical limiter 28 may be expressed by the following expression (2) and the transmittance T may be expressed by T=1−R:

$$R=(n1-n2)^2/(n1+n2)^2 \qquad (2)$$

Figure 14:
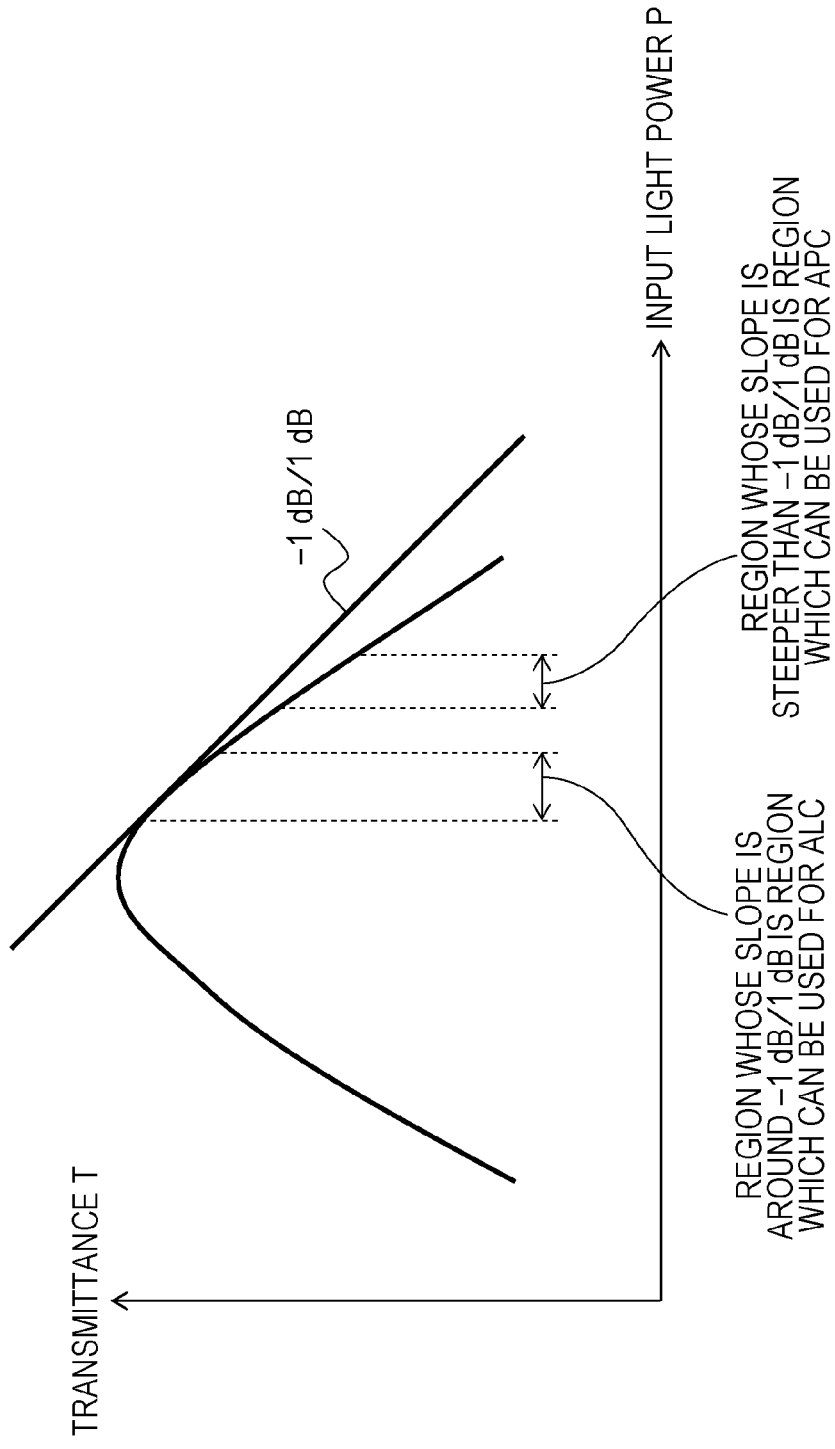
FIG. 14 is a view illustrating one example of a characteristic of input light power versus transmittance of the optical limiter exemplarily illustrated in FIG. 13.

Thus, the transmittance T to the input light power of the optical limiter 28 may be expressed as a characteristic which has an extremal value (maximum value) shifting from increase to decrease in response to the increase of the input light power P, as illustrated in FIG. 14.

The optical limiter 28 having the characteristic of a region where the transmittance T decreases as the input light power P increases may be used for uniform control of output light (automatic level control (ALC)). Stated differently, the optical limiter 28 which adjusts the refractive indices n1 and n2 so that when the input light power P increases, the transmittance T decreases to offset the increase may be used for ALC of excitation light.

Figure 15A:
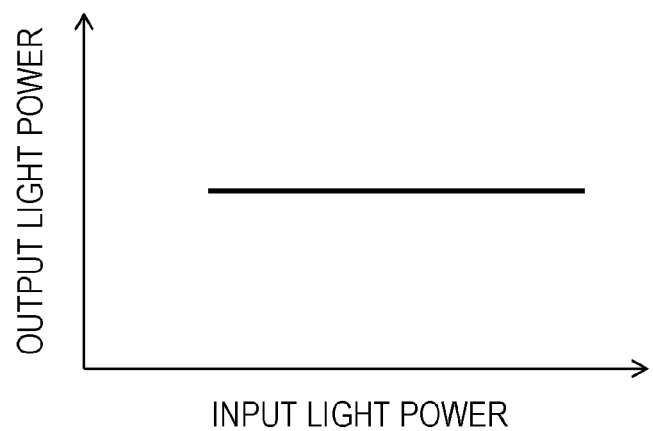
FIG. 15A and FIG. 15B are views respectively illustrating an example of characteristics of output light power to input light power and insertion loss of the optical limiter exemplarily illustrated in FIG. 13.
Figure 15B:
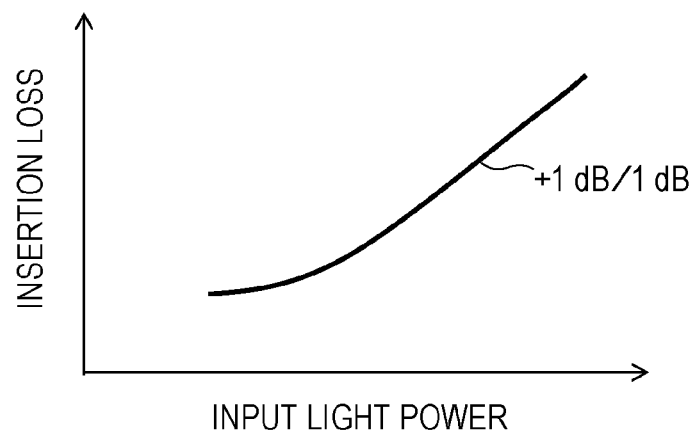

As illustrated in FIG. 15B, for example, if the optical limiter 28 has the characteristic of a region where when the input light power P increases by 1 dB, the insertion loss increases by 1 dB (a slope being+1 dB/1 dB), the transmittance T decreases by 1 dB when the input light power P increases by 1 dB. Thus, as exemplarily illustrated in FIG. 15A, the output light may be controlled to uniform level, irrespective of whether the input light power (excitation light, for example) increases or decreases.

On the one hand, the optical limiter 28 having a characteristic of a region where the transmittance T increases as the input light power P decreases may be used for uniform control of the excitation light power (automatic power control (APC)). Stated differently, the optical limiter 28 which adjusts the refractive indices n1 and n2 so that when the input light power decreases, the transmittance T increases to make up for the decrease may be used for APC of excitation light.

Figure 16A:
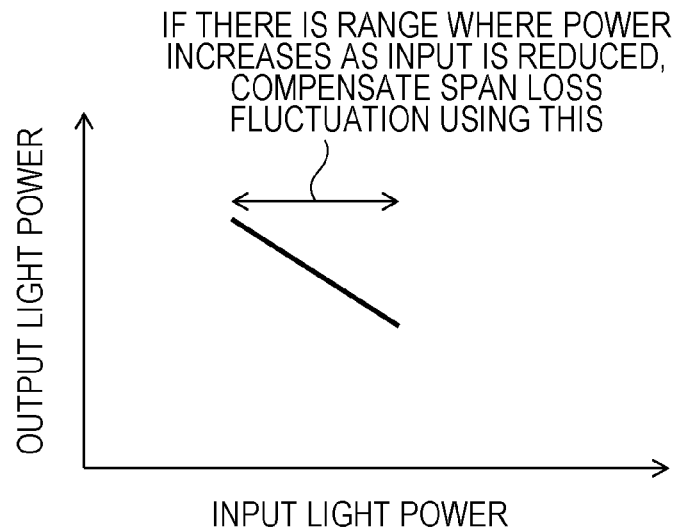
FIG. 16A and FIG. 16B are views respectively illustrating another examples of characteristics of output light power to input light power and insertion loss of the optical limiter exemplarily illustrated in FIG. 13.
Figure 16B:
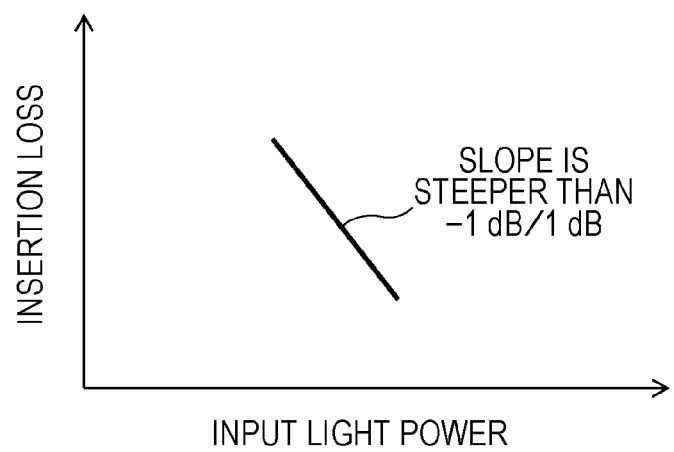

As illustrated in FIG. 16B, for example, if the optical limiter has a characteristic of a region where when the input light power P decreases by 1 dB, the insertion loss increases beyond 1 dB (a slope being sharper than −1 dB/dB), the transmittance T increases beyond 1 dB when the input light power P decreases by 1 dB.

Here, when the transmission line loss (which may also be referred to as "span loss") increases by x(dB), a gain decreases only by "kx" where a dependence rate of the gain of the EDFs 11 and 12 on the excitation light is expressed by "k", and the input light power also decreases only by "x". Thus, the output light power of the optical amplification repeater 1 decreases only by (k+1) x. To compensate the decrease, in FIG. 14, for example, the characteristic of the optical limiter 28 is adjusted so that the slope is −(k+1) xdB/1 dB.

According to the optical limiter 28 having such a characteristic, as exemplarily illustrated in FIG. 16A, as the input light (excitation light, for example) power decreases accompanying span loss, the output light power may be increased to make up for the decrease.

In the following, for convenience, the optical limiter 28 available for ALC of excitation light is designated as the "optical limiter 28ALC", and the optical limiter 28 available for APC of excitation light is designated as "optical limiter 28APC".

Figure 17:
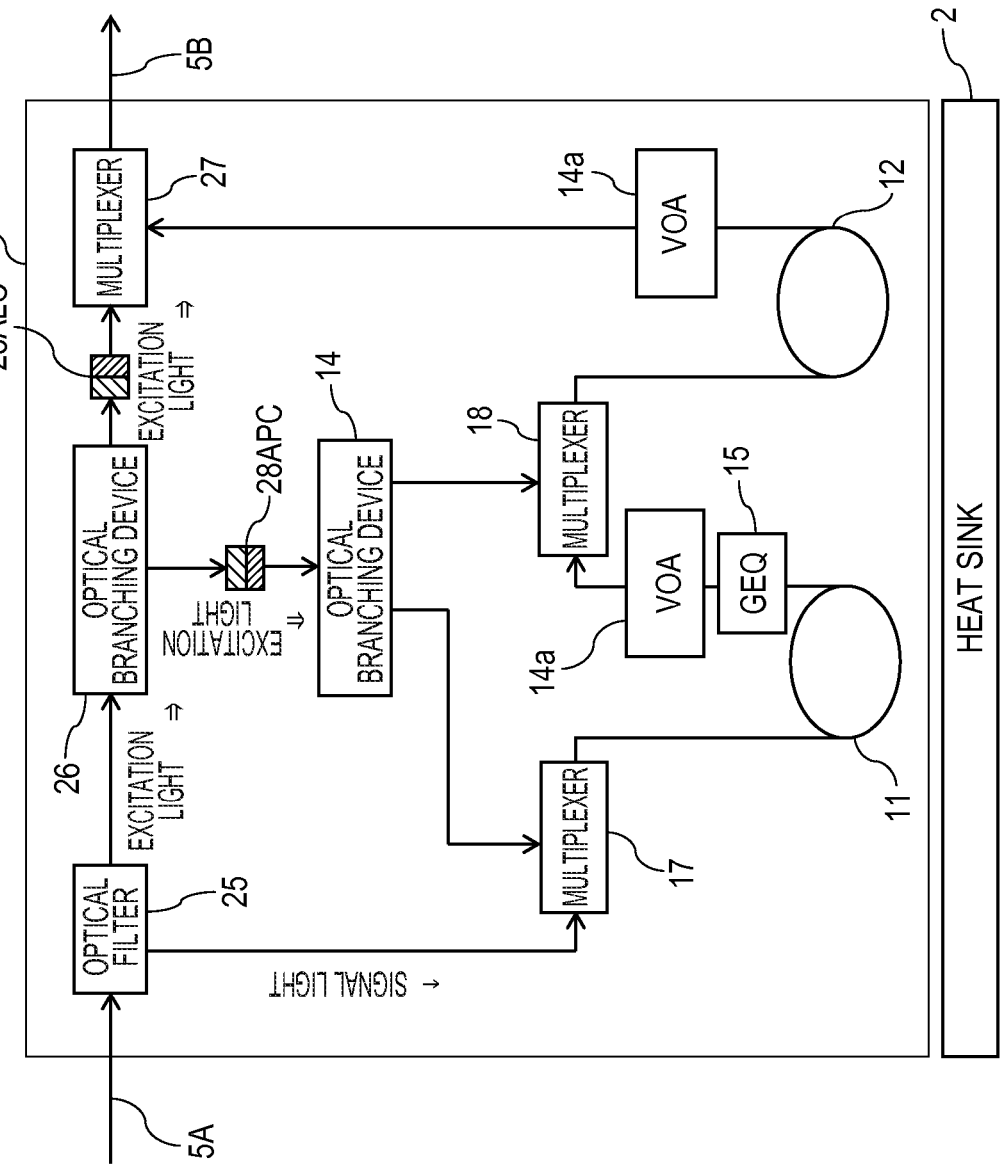
FIG. 17 is a block diagram illustrating a configuration example of application of the optical limiter exemplarily illustrated in FIG. 13 to the optical amplification repeater exemplarily illustrated in FIG. 11.

As exemplarily illustrated in FIG. 17, provision of the optical limiter 28ALC between the optical branching device 26 and the multiplexer 27 in the configuration exemplarily illustrated in FIG. 11 allows ALC of remote excitation light to be relayed to the downstream side. Thus, power fluctuations of the remote excitation light to be relayed to the downstream side are inhibited.

In addition, as exemplarily illustrated in FIG. 17, provision of the optical limiter 28APC between the optical branching device 26 and the branching-ratio variable optical branching device 14 in the configuration exemplarily illustrated in FIG. 11 allows APC of excitation light power to be inputted to the branching-ratio variable optical branching device 14. Thus, power fluctuations of the excitation light power to be inputted to the branching-ratio variable optical branching device 14 may be inhibited.

Consequently, power of the excitation light branched at the branching-ratio variable optical branching device 14 and supplied to the EDFs 11 and 12 is stable and amplification operation by the EDFs 11 and 12 is also stable. In addition, compared with power of each wavelength of WDM signal light, excitation light power is strong enough to cause the non-linear effect. Thus, as described above, the non-linear effect may be utilized. Even if an optical phase varies in the optical limiter 28, it does not cause any problem to excitation of the EDFs 11 and 12.

According to the optical amplification repeater 1 having the configuration exemplarily illustrated in FIG. 17, even if the optical amplification repeater 1 is connected in multiple stages in a WDM optical transmission system, stable no-power supply amplification relay may be implemented.

As described above, in the optical amplification repeater 1, since excitation light is simply branched, the excitation light is branched without waste and with low loss. Yet, since a branching ratio may be made variable in response to a temperature change, autonomous compensation of a gain tilt may be implemented. In addition, no-power supply amplification relay which is also practically available in multiple stage relay is allowed.

Individual Reception Configuration of Signal Light and Excitation Light

Figure 18:
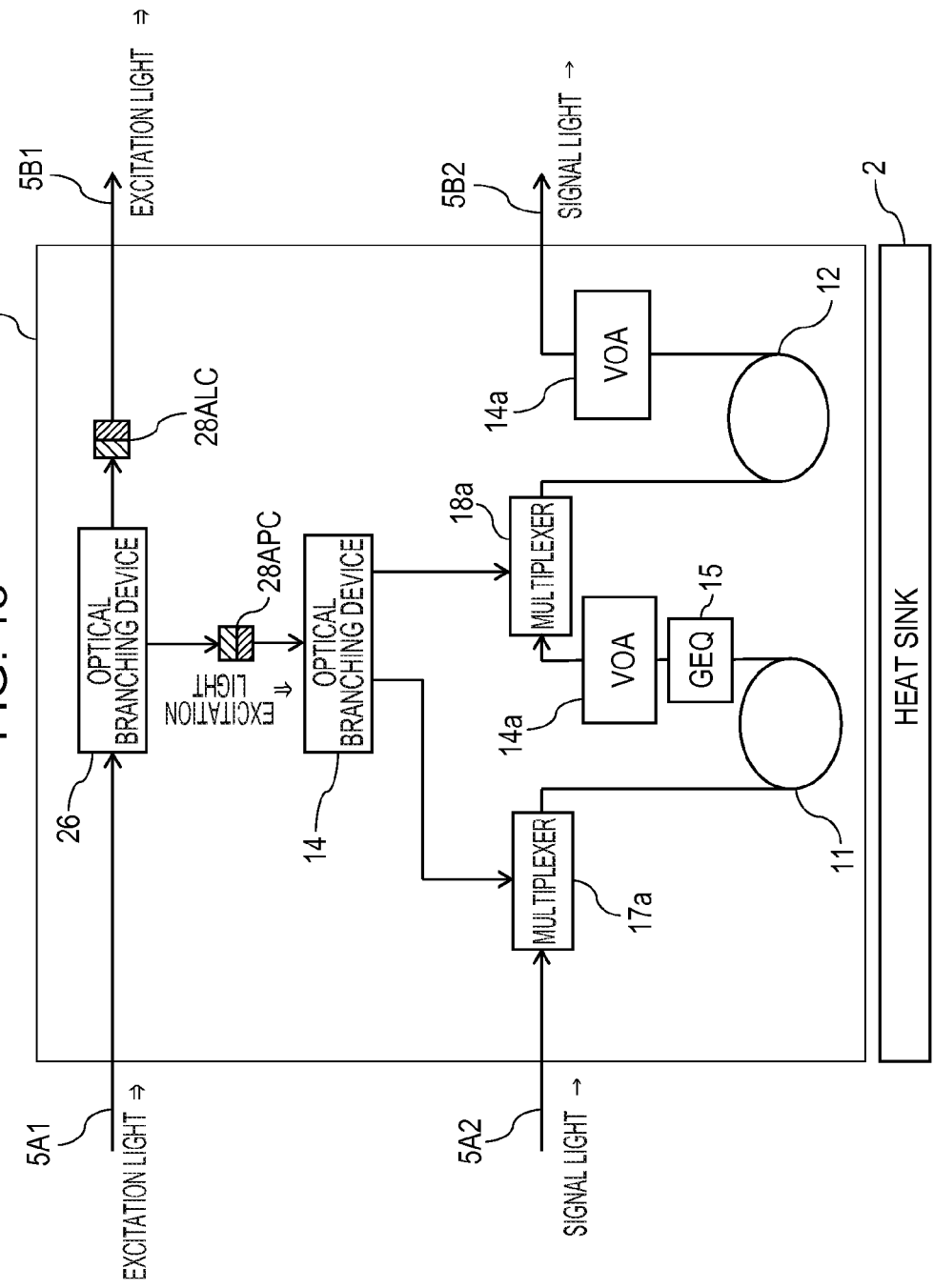
FIG. 18 is a block diagram illustrating a variation example of the optical amplification repeater exemplarily illustrated in FIG. 17.

While the optical amplification repeater 1 provided with the optical limiter 28 as exemplarily illustrated in FIG. 17 is such configured that excitation light is received with signal light through the optical transmission line 5A, the signal light and the excitation light may be received through individual optical transmission lines 5A1 and 5A2 as exemplarily illustrated in FIG. 18. In addition, the signal light amplified at the optical amplification repeater 1 (EDFs 11 and 12) and the excitation light to be relayed to the downstream side may be transmitted through individual transmission lines 5B1 and 5B2.

In the example of FIG. 18, the excitation light is received through the optical transmission line 5A1 and the signal light is received through the optical transmission line 5A2. In addition, the excitation light to be relayed to the downstream side is transmitted through the optical transmission line 5B1 and the signal light is transmitted through the optical transmission line 5B2.

An optical fiber transmission line of a same type or a different type may be applied to the optical transmission lines 5A1 and 5A2 (5B1 and 5B2).

As a non-limiting example, a multi-mode (which may also be referred to as "multi-core") fiber may be applied to the optical transmission lines 5A1 and 5B1 which transmit the excitation light, and a single-mode fiber may be applied to the optical transmission lines 5A2 and 5B2 which transmit the signal light. The larger the cross-sectional area of the optical transmission lines 5A1 and 5B1 which transmit the excitation light is, the more the excitation light power which may be transmitted increases.

Thus, excitation light having power which is desirable depending on a transmission distance of signal light or the number of stages of the optical amplification repeater 1 (number of spans) may be transmitted (relayed) by the optical transmission lines 5A1 and 5B1. Stated differently, restrictions on the excitation light power may be alleviated compared with a case in which signal light and excitation light are transmitted by the same optical transmission line 5A (5B), as in the configuration of FIG. 17. Consequently, a degree of freedom as an optical transmission system or transmission performance may be improved.

As may be seen from a comparison of FIG. 17 and FIG. 18, the signal light and the excitation light are not desirable to be separated and multiplexed in the optical amplification repeater 1 exemplarily illustrated in FIG. 18. Thus, the optical filter 25 and the multiplexer 27 exemplarily illustrated in FIG. 17 are disused.

Accordingly, in FIG. 18, one excitation light branched at the branching-ratio variable optical branching device 14 is multiplexed at the multiplexer 17 with the signal light received through the optical transmission line 5A2 and inputted to the EDF 11. In addition, the other excitation light branched at the branching-ratio variable optical branching device 14 is multiplexed with the signal light after being amplified by the EDF 11 and inputted to the EDF 12. The signal light amplified at the EDF 12 is transmitted to the optical transmission line 5B2 on the downstream side through the VOA 14a.

Backward Excitation Configuration

Figure 19:
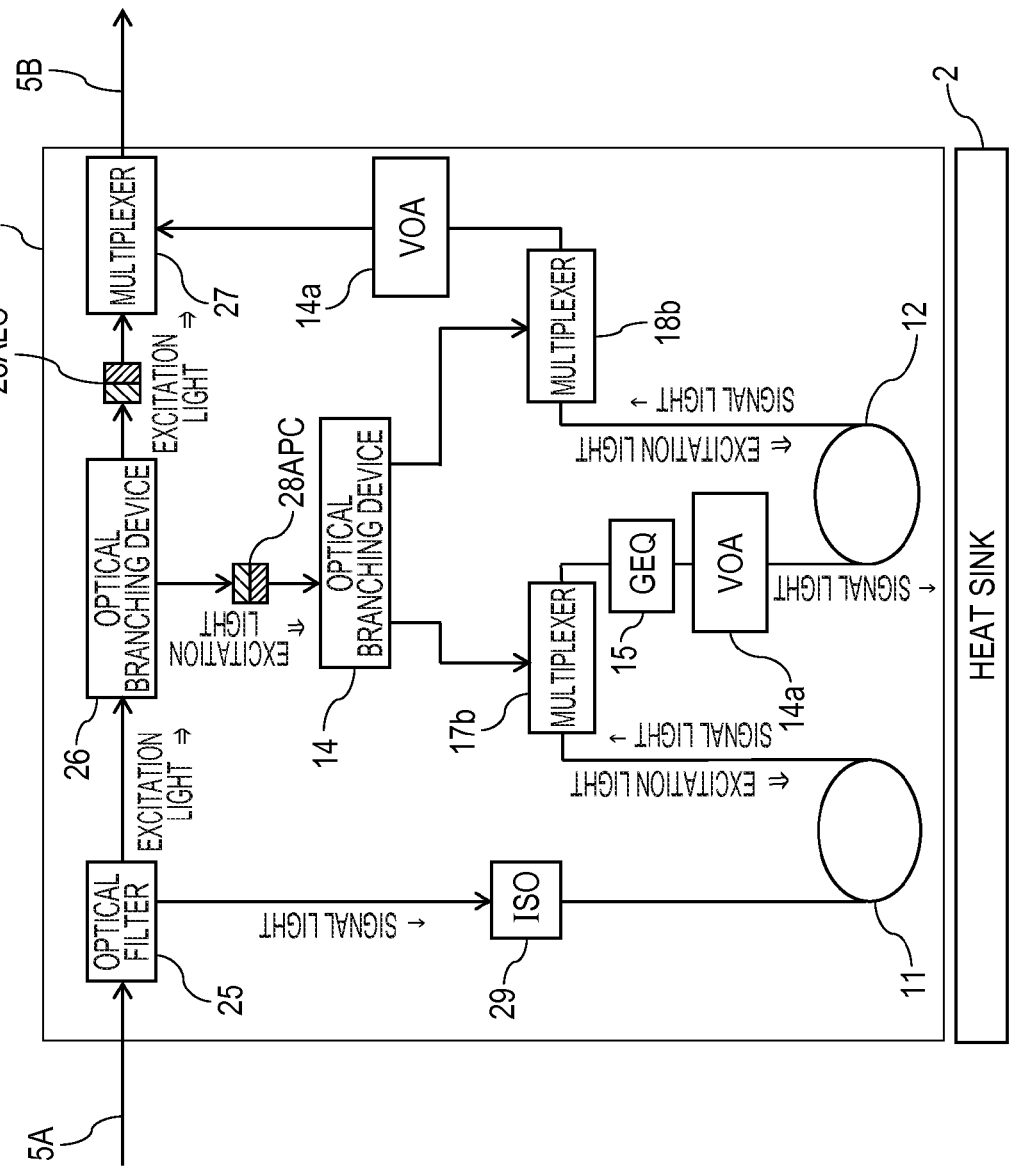
FIG. 19 is a block diagram illustrating a variation example of the optical amplification repeater exemplarily illustrated in FIG. 17.
Figure 20:
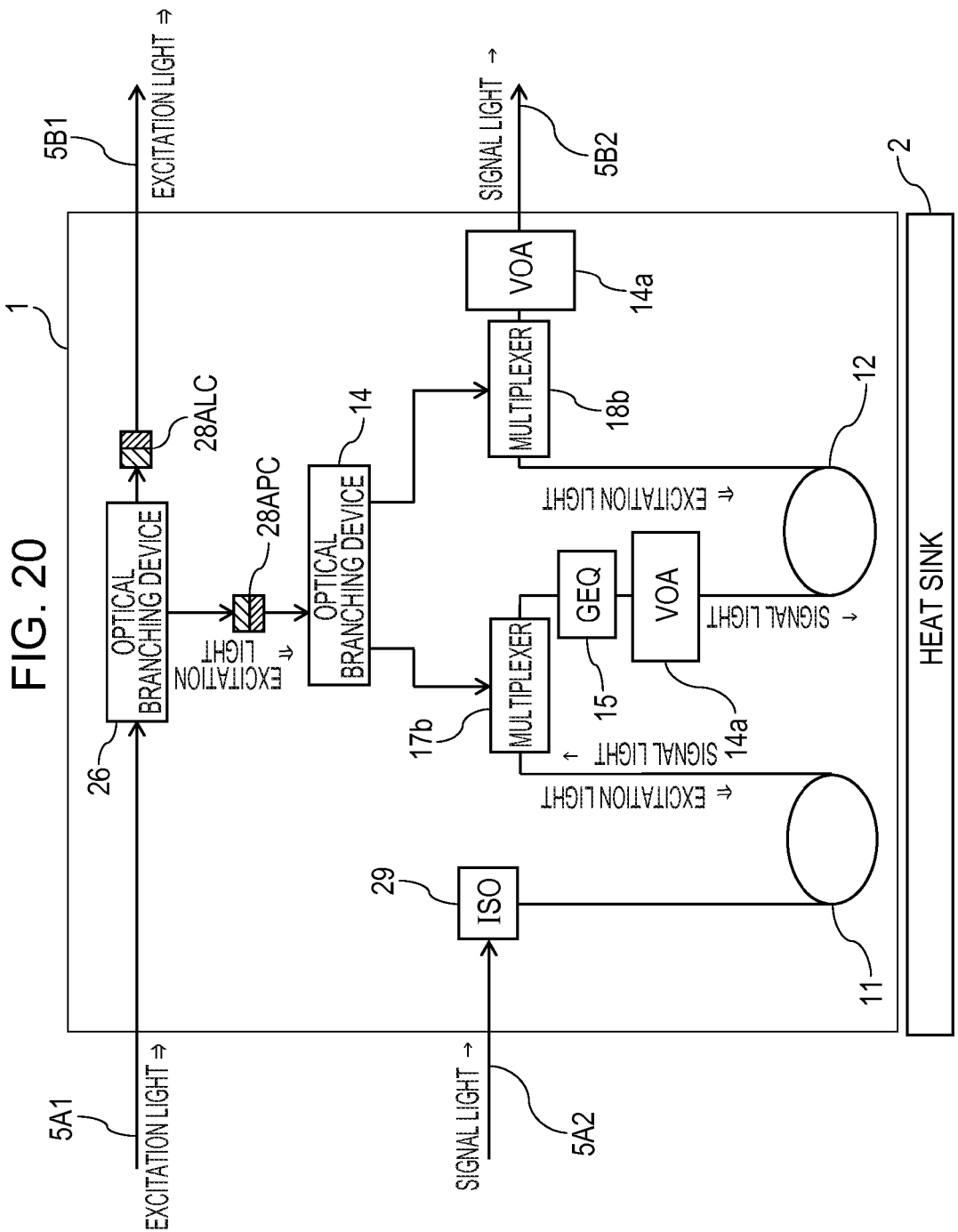
FIG. 20 is a block diagram illustrating a variation example of the optical amplification repeater exemplarily illustrated in FIG. 17.

While the configurations of the optical amplification repeaters 1 exemplarily illustrated in FIG. 11, FIG. 17, and FIG. 18 correspond to so-called a "forward pumping configuration", they may be a "backward pumping configuration" as exemplarily illustrated in FIG. 19 and FIG. 20. The configuration exemplarily illustrated in FIG. 19 corresponds to a configuration which is made by changing the "forward pumping configuration" exemplarily illustrated in FIG. 17 to the "backward pumping configuration". The configuration exemplarily illustrated in FIG. 20 corresponds to a configuration which is made by changing the "forward pumping configuration" exemplarily illustrated in FIG. 18 to the "backward pumping configuration".

For example, in the optical amplification repeater 1 illustrated in FIG. 19, excitation light is introduced to the EDFs 11 and 12 in a direction opposite to a transmission direction of signal light, through the multiplexers 17b and 18B which are each provided on the subsequent stage of the EDFs 11 and 12.

For example, the multiplexer 17b may be an optical filter, outputs one excitation light branched at the branching-ratio variable optical branching device 14 to the EDF 11, and outputs the output light of the EDF 11 to the side of the EDF 12 on the subsequent stage (GEQ 15, for example).

The multiplexer 18b may also be an optical filter, outputs the other excitation light branched at the branching-ratio variable optical branching device 14 to the EDF 12, and outputs the output light of the EDF 12 to the multiplexer 27 through the VOA 14a.

In addition, an optical isolator (ISO) 29 configured to block propagation of the excitation light which passes through the EDF 11 in a direction opposite to the transmission direction of the signal light may be provided between the optical filter 25 and the EDF 11, as exemplarily illustrated in FIG. 19. The optical isolator 29 lets the signal light separated by the optical filter 25 pass in one direction (input of the EDF 11).

The optical amplification repeater 1 exemplarily illustrated in FIG. 20 corresponds to a configuration in which, similar to the configuration exemplarily illustrated in FIG. 18, an aspect that signal light and excitation light are transmitted through the individual optical transmission lines 5A1 and 5A2 (5B1 and 5B2) is applied to the "backward pumping configuration" exemplarily illustrated in FIG. 19.

Thus, in FIG. 20, the optical filter 25 and the multiplexer 27 exemplarily illustrated in FIG. 19 are disused. The configuration example of FIG. 20 is similar to the configuration example of FIG. 19 in that the excitation light branched at the branching-ratio variable optical branching device 14 is introduced to the EDFs 11 and 12 in the direction opposite to the transmission direction of the signal light, through the multiplexers 17b and 18b.

Reverse Direction Excitation Configuration

Figure 21:
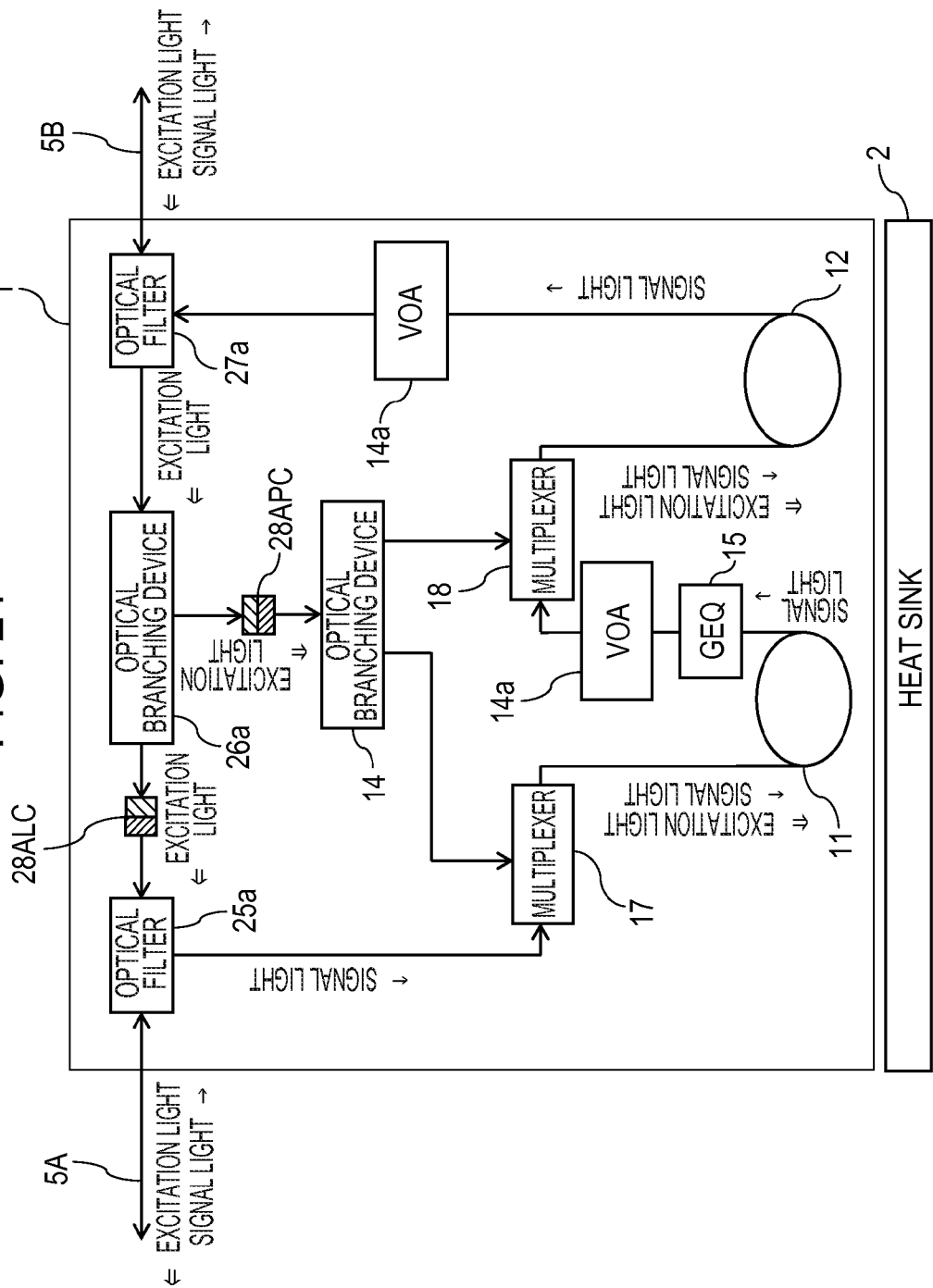
FIG. 21 is a block diagram illustrating a variation example of the optical amplification repeater exemplarily illustrated in FIG. 17.
Figure 22:
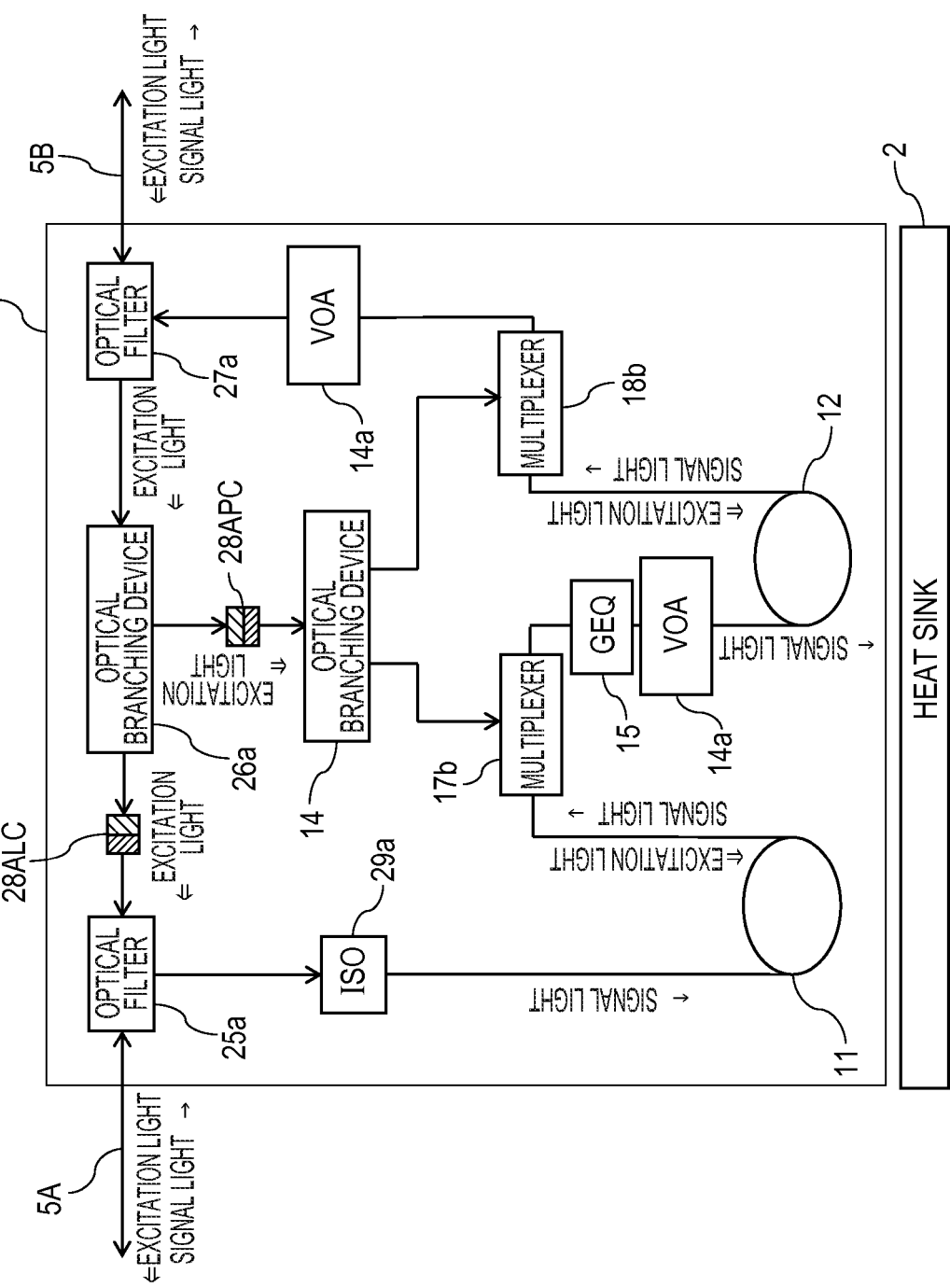
FIG. 22 is a block diagram illustrating a variation example of the optical amplification repeater exemplarily illustrated in FIG. 17.
Figure 23:
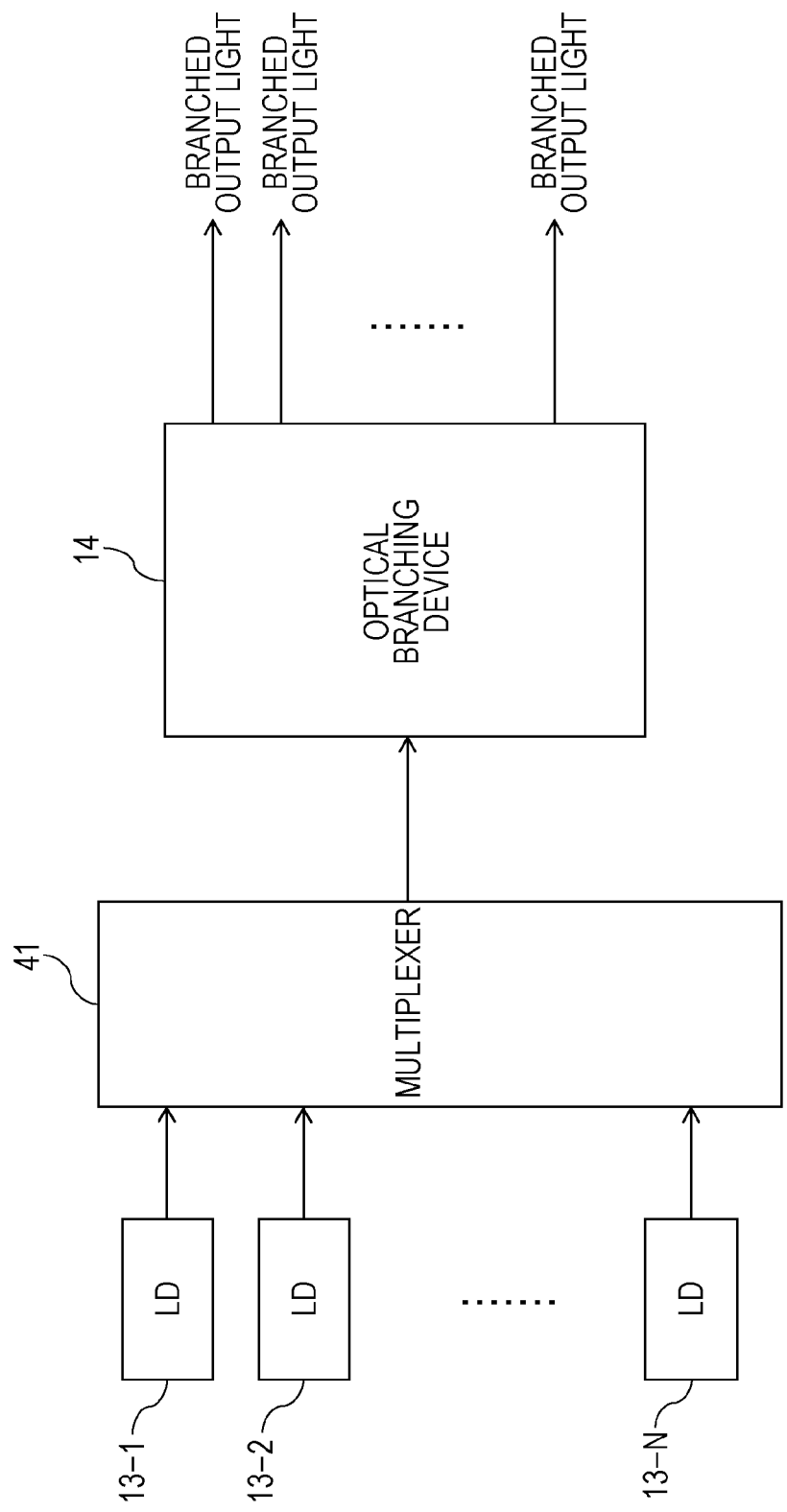
FIG. 23 is a block diagram for illustrating another application examples of the optical branching device exemplarily illustrated in FIG. 5 to FIG. 10.

While any of the optical amplification repeater 1 exemplarily illustrated in FIG. 11 and FIG. 17 to FIG. 20 is such configured that remote excitation light is received from the upstream side, the optical amplification repeater 1 may be such configured that the remote excitation light is received from the reverse downstream side, as exemplarily illustrated in FIG. 21 and FIG. 22.

FIG. 21 illustrates a configuration example in which each of the EDFs 11 and 12 is "forward pumped" by using excitation light received from the downstream side (the optical transmission line 5B). FIG. 22 illustrates a configuration example in which each of the EDFs 11 and 12 is "backward pumped" by using excitation light received from the downstream side (the optical transmission line 5B).

In any of the configurations exemplarily illustrated in FIG. 21 and FIG. 22, the excitation light is transmitted in a direction opposite to the signal light in the optical transmission lines 5A and 5B. Thus, the optical filter 25, the optical branching device 26, and the multiplexer 27 exemplarily illustrated in FIG. 11, FIG. 17, and FIG. 19 are each replaced by the optical filter 25a, the optical branching device 26a, and the multiplexer 27a. In addition, in FIG. 21 and FIG. 22, the optical limiter 28ALC is provided between the optical filter 25a and the optical branching device 26 since the excitation light is transmitted (relayed) to the upstream side. With the optical limiter 28ALC, power fluctuations depending on transmission line loss of excitation light to be relayed to the upstream side may be inhibited as already described above. Note that arrangement and position of the optical limiter 28APC remains same as the configuration examples which have already been described (see FIG. 17 to FIG. 20).

The optical filter 25a outputs to the multiplexer 17 signal light received from the optical transmission line 5A on the upstream side and outputs to the optical transmission line 5A excitation light received from the optical limiter 28ALC. The optical filter 25a may be implemented by means of an optical circulator.

The optical filter 27a outputs to the optical transmission line 5B on the downstream side signal light inputted from the EDF 12 through the VOA 14a and outputs to the optical branching device 26a excitation light received from the optical transmission line 5B.

The optical branching device 26a branches the excitation light which passes through the optical filter 27a, outputs one branched excitation light to the side of the branching-ratio variable optical branching device 14 (optical limiter 28APC), and outputs the other branched excitation light to the side of the optical transmission line 5A (optical limiter 28ALC).

The configuration of FIG. 21 is similar to the configuration example of FIG. 17 in that the excitation light branched at the branching-ratio variable optical branching device 14 is each introduced through the multiplexers 17 and 18 to the EDFs 11 and 12 in the same direction as the transmission direction of the signal light.

On the one hand, the configuration of FIG. 22 is similar to the configuration example of FIG. 19 in that the excitation light branched at the branching-ratio variable optical branching device 14 is each introduced through the multiplexers 17b and 18b to the EDFs 11 and 12 in a direction opposite to the transmission direction of the signal light, and that the EDFs 11 and 12 are each backward pumped.

Note that in the configurations of the optical amplification repeaters 1 exemplarily illustrated in FIG. 21 and FIG. 22, an aspect that signal light and excitation light are transmitted through the individual transmission lines 5A1 and 5A2 (5B1 and 5B2), as exemplarily illustrated in FIG. 18 and FIG. 20 may also be applied. In addition, in the optical amplification repeater 1, remote excitation light may be received from both the upstream side and the downstream side.

In addition, one of the EDFs 11 and 12 of the optical amplification repeater 1 may be "forward pumped" and the other may be "backward pumped" by excitation light branched at the branching-ratio variable optical branching device 14, or both may be pumped.

In any aspect, autonomous compensation of a gain tilt of the EDFs 11 and 12 by the temperature-dependent branching-ratio variable optical branching device 14 and fluctuation control of excitation light power by the optical limiter 28 may be implemented.

Other Applications of the Branching-Ratio Variable Optical Branching Device 14

The temperature-dependent branching-ratio variable optical branching device 14 described above may be provided on the subsequent stage of a multiplexer 41 configured to multiplex output light (laser beam) of a plurality of light sources (LDs, for example) 13-1 to 13-N (where N is an integer of 2 or higher). In this case, the branching-ratio variable optical branching device 14 may branch and output laser beam multiplexed at the multiplexer 41 at a branching ratio depending on a temperature.

Therefore, excitation light of desirable power may be multicast while extending life of each LD 13-$i$ by inhibiting output light power of each of the LD 3-$i$ ($i$=any of 1 to N).

Note that while in the embodiments described above, examples in which a target which makes a branching ratio variable depending on temperature is excitation light are described, the target is not limited to the excitation light. Other light such as signal light may be a temperature-dependent target with a variable branching ratio.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical branching device, comprising:
   a first Faraday rotator capable of controlling polarized wave of input light based on a change of a magnetic flux density depending on a magnetic field to be provided;
   a first magnet configured to provide the first Faraday rotator with the magnetic field;
   a first polarization beam splitter configured to branch, by a polarized wave component, the input light which passes through the first Faraday rotator;

a first bimetal configured to deform depending on a temperature; and a first controller configured to have a mechanism to use force accompanying with the deformation of the first bimetal so as to control a relative positional relationship between the first Faraday rotator and the first magnet.

2. The optical branching device according to claim 1, further comprising:

a second Faraday rotator capable of controlling polarized wave of input light based on a change of a magnetic flux density depending on a magnetic field to be provided;

a second magnet configured to provide the second Faraday rotator with the magnetic field;

a second polarization beam splitter configured to branch, by a polarized wave component, the input light which passes through the second Faraday rotator;

a second bimetal configured to deform depending on a temperature; and a second controller configured to have a mechanism to use force accompanying with the deformation of the second bimetal so as to control a relative positional relationship between the second Faraday rotator and the second magnet;

a third polarization beam splitter configured to branch input light by a polarized wave component so as to output, to the first and second Faraday rotators respectively, beams to which the input light is branched by the polarized wave components;

a first multiplexer configured to multiplex beams of light of a first polarized wave component which are branched respectively by the first and second polarization beam splitters; and a second multiplexer configured to multiplex beams of light of a second polarized wave component which are branched respectively by the first and second polarization beam splitters.

3. The optical branching device according to claim 1, wherein the bimetal is made by laminating metals having different thermal expansion coefficients.

4. An optical amplification apparatus, comprising:

a Faraday rotator capable of controlling polarized wave of excitation light inputted therein based on a change of a magnetic flux density depending on a magnetic field to be provided;

a magnet configured to provide the Faraday rotator with the magnetic field;

a polarization beam splitter configured to branch, by a polarized wave component, the excitation light passing through the Faraday rotator;

a first optical amplification medium configured to use first branched excitation light branched by the polarization beam splitter to amplify signal light;

a second optical amplification medium configured to use second branched excitation light branched by the polarization beam splitter to amplify the signal light;

a bimetal configured to deform depending on a temperature; and a controller configured to have a mechanism to use force accompanying the deformation of the bimetal so as to control a relative positional relationship between the Faraday rotator and the magnet.

5. The optical amplification apparatus according to claim 4, wherein the bimetal is made by laminating metals having different thermal expansion coefficients.

6. The optical amplification apparatus according to claim 4, wherein the excitation light is supplied remotely together with the signal light or separately from the signal light.

7. The optical amplification apparatus according to claim 4, further comprising:

a variable optical attenuator configured to adjust an attenuation amount of the excitation light passing through the Faraday rotator, based on power of the excitation light.

8. The optical amplification apparatus according to claim 6, further comprising:

an optical branching device configured to branch the excitation light to first excitation light to be inputted to the Faraday rotator and second excitation light to be relayed to another optical amplification apparatus; and a variable optical attenuator configured to adjust an attenuation amount of the second excitation light, based on power of the second excitation light.

9. The optical amplification device according to claim 4, wherein the optical amplification device is laid under the ground.

10. The optical amplification apparatus according to claim 4, wherein the excitation light to be inputted to the Faraday rotator is light resulting from multiplexing of a plurality of beams of light outputted from a plurality of light sources.

11. An optical amplification method comprising:

controlling a relative positional relationship between a Faraday rotator and a magnet by using force accompanying with deformation of a bimetal configured to deform depending on a temperature, the Faraday rotator being capable of controlling polarized wave of excitation light inputted therein based on a change of a magnetic flux density depending on a magnetic field to be provided, the magnet being configured to provide the Faraday rotator with the magnetic field;

branching, by a polarized wave component, the excitation light passing through the Faraday rotator into a first branched excitation light and a second branched excitation light;

amplifying signal light by using the first branched excitation light; and amplifying the signal light by using the second branched excitation light.

* * * * *